United States Patent
Jones et al.

(10) Patent No.: US 7,233,413 B2
(45) Date of Patent: Jun. 19, 2007

(54) GAMUT DESCRIPTION AND VISUALIZATION

(75) Inventors: David Edward Jones, Newark, DE (US); John Stephen Locke, Hockessin, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 71 days.

(21) Appl. No.: 10/301,952

(22) Filed: Nov. 22, 2002

(65) Prior Publication Data

US 2004/0100643 A1   May 27, 2004

(51) Int. Cl.
*G06F 15/00* (2006.01)
*G03F 3/08* (2006.01)

(52) U.S. Cl. ........................... 358/1.9; 358/520
(58) Field of Classification Search ............ 358/1.9, 358/520, 502, 515, 518, 530; 382/162, 167
See application file for complete search history.

(56) References Cited

U.S. PATENT DOCUMENTS

| | | | | |
|---|---|---|---|---|
| 5,625,378 A | * | 4/1997 | Wan et al. ............... | 345/600 |
| 5,721,572 A | * | 2/1998 | Wan et al. ............... | 345/590 |
| 5,740,076 A | * | 4/1998 | Lindbloom ............... | 345/590 |
| 5,818,460 A | * | 10/1998 | Covey et al. ............. | 345/443 |
| 5,991,511 A | * | 11/1999 | Granger .................... | 358/1.9 |
| 6,023,523 A | * | 2/2000 | Cohen et al. ............. | 382/154 |
| 6,035,067 A | * | 3/2000 | Ponticos .................. | 382/226 |

(Continued)

FOREIGN PATENT DOCUMENTS

JP           2988045        3/1993

(Continued)

OTHER PUBLICATIONS

Saito et al., "Dot Allocations in Dither Matrix with Wide Color Gamut", Journal of Imaging Science and Technology, 1999, pp. 345-352, vol. 43-4, Faculty of Engineering, Chiba University, Chiba, Japan.

(Continued)

*Primary Examiner*—Madeleine AV Nguyen
(74) *Attorney, Agent, or Firm*—Steven C. Benjamin; Bart E. Lerman

(57) ABSTRACT

This invention pertains to a computer-implemented method and program for the comparison of color gamuts.

Using first and second collections of sample color points respective hulls are created in a color space. The set of all of the points disposed on the surface of the a hull or within the volume enclosed thereby represents the respective color gamut. The hulls are combined, preferably by a Boolean operation, to create a third hull in the color space representing at least one region of overlap or at least one region of exclusion between the first color gamut and the second color gamut. The volume of at least one of the hulls may be calculated and compared to the volume of the region of overlap and/or the region of exclusion.

A visual display of the contour produced by the intersection of one or both of the hulls with a plane perpendicular to a predetermined reference line in the color space may be created to ascertain qualitatively the degree of alignment of the first and second hulls along the reference line. The determination of whether a given color point lies within a hull may also be made.

51 Claims, 13 Drawing Sheets

U.S. PATENT DOCUMENTS

| | | | |
|---|---|---|---|
| 6,225,974 B1* | 5/2001 | Marsden et al. | 345/590 |
| 6,384,836 B1* | 5/2002 | Naylor et al. | 345/589 |
| 6,456,300 B1* | 9/2002 | Pettigrew | 345/634 |
| 6,459,436 B1* | 10/2002 | Kumada et al. | 345/590 |
| 6,480,301 B1* | 11/2002 | Cholewo | 358/1.9 |
| 6,571,012 B1* | 5/2003 | Pettigrew | 382/167 |
| 6,961,461 B2* | 11/2005 | MacKinnon et al. | 382/164 |
| 2002/0012461 A1* | 1/2002 | MacKinnon et al. | 382/164 |
| 2002/0122190 A1* | 9/2002 | Harrington | 358/1.9 |
| 2002/0140701 A1* | 10/2002 | Guyler | 345/501 |
| 2003/0063670 A1* | 4/2003 | Masukura et al. | 375/240.09 |

FOREIGN PATENT DOCUMENTS

| | | |
|---|---|---|
| JP | 11-345933 | 12/1999 |
| JP | 2000-510288 | 8/2000 |
| JP | 2000-294522 | 10/2000 |
| JP | 2001-53218 | 2/2001 |
| JP | 2002-25948 | 1/2002 |
| WO | WO 03/079431 | 3/2003 |

OTHER PUBLICATIONS

Cholewo et al., "Gamut Boundary Determination Using Alpha-shapes", 5 pages, Lexmark International, Inc., Lexington, KY.
Meyer et al., "A Data Flow Approach to Color Gamut Visualization", The Fifth Color Imaging Conference: Color Science, Systems, and Applications, pp. 209-214, Department of Computer and Information Science, University of Oregon, Eugene, Oregon.
Patent Abstracts of Japan, 2002-025948 (2 pages).
Patent Abstracts of Japan, 2000-294522 (1 page).
Patent Abstracts of Japan, 2001-053218 (1 page).
Patent Abstracts of Japan, 11-345933 (2 pages).
Patent Abstracts of Japan, 05-075014 (2 pages).
Integrated Circuits and Method for Their Fabrication, WO9819337 (1 page).

* cited by examiner

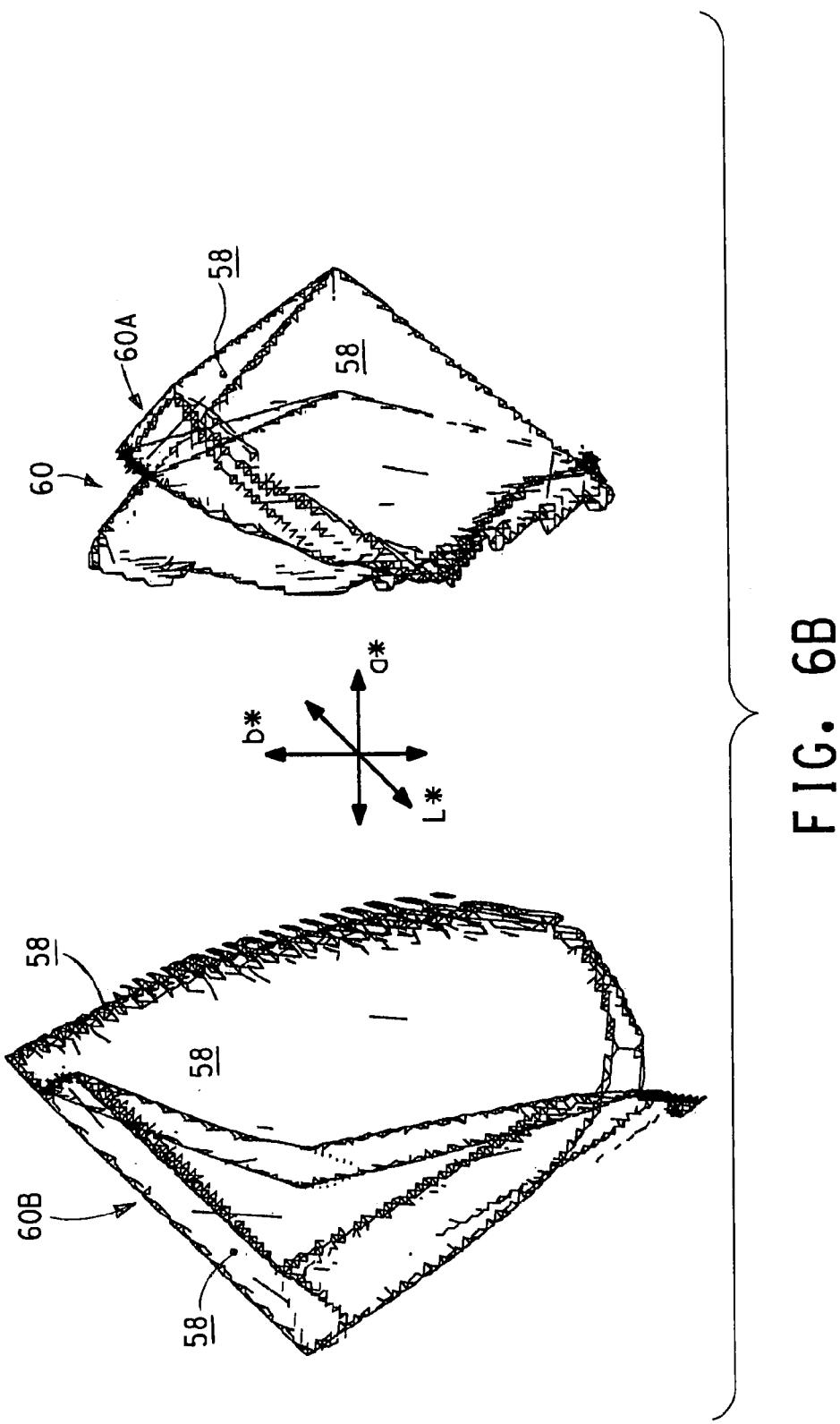

GAMUT DESCRIPTION AND VISUALIZATION

FIELD OF THE INVENTION

This invention pertains to a computer-implemented method for comparing a first color gamut to a second color gamut that is especially useful when each gamut characterizes a different color generating apparatus.

DESCRIPTION OF THE PRIOR ART

Presently, the rotary screen printer is the primary color generating apparatus used for the printing of textile fabrics. For commercial quantities screen printing is fast and economical. However, due to the cost of screen fabrication the economies of scale offered by screen printing are lost in instances when it is desired to produce only a limited number of fabrics. For example, in the case of a textile proofing run industry practice requires that a small number of fabrics be produced to demonstrate color and pattern of the fabric intended for production. Making an entire set of screens to render the small number of demonstration fabrics is cost prohibitive.

Accordingly, the textile industry is turning to the use of other forms of printing apparatus for the production of such demonstration runs. One such printing apparatus useful as a proofing printer for a demonstration run is the production ink jet printer manufactured and sold by E. I. Du Pont de Nemours and Company as Artistri™ Ink Jet 3210 printer.

When using a printing apparatus other than a screen printer for a demonstration run it is important to verify that the color(s) of a prototype textile as rendered by the proofing apparatus will be able to be exactly rendered by the screen printer.

This verification can be difficult to achieve because determining the color of an object is a complex interplay of the illuminant conditions, the spectral characteristics of the object itself, and the response of a human observer.

However, the relationship of these factors can be described mathematically. Although the mathematics may be used to define color in any N-dimensional color space, most commonly a three-dimensional system is used to describe color in a general, visually-uniform way. One of the most used three-dimensional systems of color description is the CIE L*a*b* system.

The CIE L*a*b* system is a three-dimensional system for representing the color of an object in terms of color parameters arranged along three mutually orthogonal coordinate axes, viz., L*, a*, and b*. The L* axis is the lightness axis and ranges from values of 0 to 100 (black to white). The a* axis is the red/green axis and indicates colors ranging from green (−a*) to red (+a*). The b* axis is blue/yellow axis and indicates colors that range from blue (−b*) to yellow (+b*). A complete description of the CIE L*a*b* system is found in CIE Publication 15.2 or in various standards collections such as ASTM E-308.

The representation of a particular color in the CIE L*a*b* system can be envisioned as a point in the three-dimensional space. The collection of color points produced by any given color generating apparatus comprised of colorants and their mixtures acting upon the medium may likewise be envisioned as a unique three-dimensional solid in that color space. The bounding surface of the solid is termed the "hull". The collection of color points on the surface of and enclosed within the "hull" of the solid represents the "gamut" of the color generating apparatus and represents all of the colors able to be produced by the particular color generating apparatus. Thus, all colors on the hull or within the volume enclosed thereby are achievable by the color generating apparatus, while those lying outside the hull are not.

The points on the hull of the three dimensional solid represent the most colorful colors in all directions from the origin able to be rendered by the color generating apparatus. This distance represents the maximum obtainable color by the system for that direction and is often referred to as "chroma" (C*). Chroma" (C*) is represented mathematically CIE L*a*b* system as the square root of the sum of the squares of the a* and b* coordinates. The surface points thus describe the most vibrant colors (e.g., the "reddest" red, the "greenest" green) that is obtainable for that particular system.

The computer modeling package Color 3-D, Ver 2.0, Copyright 1999, available from ExactC, Campbell, Calif., allows limited visualization of a three dimensional gamut.

Because the hull is at least a three-dimensional construct its size can be evaluated as a volume in the color space. Gamut volume is discussed in R. Saito and H. Kotera, Dot Allocations in Dither Matrix with Wide Color Gamut, J. Imaging Science and Technology, 43:4, 345, (1999).

U.S. Pat. No. 6,480,301 defines a gamut by computing an alpha shape. Two gamuts are compared by determining an intersection volume and then calculating the percent overlap. The comparison is a simple volumetric ratio and provides no definition of the color space actually overlapped (intersected). No visual display can be made of gamut overlap or difference.

There still exists a need for improved methods of gamut comparison and evaluation. It is believed advantageous to utilize the hulls in three dimensional color space respectively representative of the gamuts of various color generating apparatus to provide comparisons of color rendering capabilities thereof or to provide information regarding the color rendering capability of a given color generating apparatus.

SUMMARY OF THE INVENTION

In general, the present invention is directed to a computer-implemented method for comparing color gamuts and to a computer readable medium containing a program that configures a computer to perform the method.

Using respective first and second collections of sample color points, each representing a location in at least a three-dimensional color space and each corresponding to a color in a respective color gamut, a respective hull is created in the color space. At least one collection of sample color points is produced by a color generating apparatus, and thus each sample point corresponds to a color in the color gamut able to be produced by that color generating apparatus. In the preferred instance the hull is defined by creating a plurality of boundary surfaces that collectively define each respective hull. All of the points disposed on the surface of a hull or within the volume enclosed thereby represent the respective color gamut.

From the first and second hulls a third hull in the color space is generated representing at least one region of overlap or at least one region of exclusion between the first color gamut and the second color gamut. A third hull defining a region of overlap contains color points that are overlapped by the first and second hulls. The color points on the surface of the third hull or enclosed therewithin thus represent those colors that lie within both the first and second gamuts. The combination of the first and second hulls is preferably effected using a Boolean operation, such as the intersection operation.

A third hull produced by the combination of the first and second hulls to defining a region of exclusion contains points that are on the surface of or within one hull that are different from points on or within the other hull. In this case color points on the surface of the third hull or enclosed therewithin represents the colors in one gamut not within the other. This combination of the first and second hulls is also preferably effected using a Boolean operation, such as the difference operation.

The volume of the hull representing a region of overlap or a region of exclusion may be calculated. One or both of these volume(s) may be compared with the volume of one of the first or second hulls to quantify the degree of overlap or exclusion of one hull with the other.

In yet another aspect of the invention, for each of a plurality of locations along a predetermined reference line in the color space, a visual display of the contour in a plane perpendicular to that reference line that is produced by the intersection of one or both the first and the second hulls with that plane is generated. From inspection of the series of these views of the contours of one or both hulls with a viewing plane the degree of alignment of the first and second hulls along the axis is qualitatively ascertained.

In still another aspect a determination may be made whether a point representing a predetermined candidate color lies within the hull representative of a gamut of a color generating apparatus. Prior to that determination, to add robustness, to compensate for variability due to floating point arithmetic and to achieve maximum integer calculation accuracy, the collection of sample color points used to generate the hull representing the gamut and the predetermined color point are scaled by a scale factor determined in accordance with the values in the color space of the sample color points and the predetermined color point.

In general, in the present invention the calculation of the results of Boolean operations on gamuts is based upon geometric modeling. The boundary representation for a gamut is the polyhedron called the hull and the representation of the gamut is all points on or within the hull. A Boolean operation on two gamuts is equivalent to an equivalent Boolean operation on the hulls. For example, as will be developed herein, to find the intersection of two gamuts a new hull based upon where the polygons in one hull clip the polygons in the other hull is generated. In geometric modelling this is referred to as Constructive Solid Geometry.

BRIEF DESCRIPTION OF THE DRAWINGS

The invention will be more fully understood from the following detailed description, taken in connection with the accompanying drawings, in which:

FIG. 6B is an isolated view of the difference hull segments of FIG. 6A;

DETAILED DESCRIPTION OF PREFERRED EMBODIMENT

Figure 1:
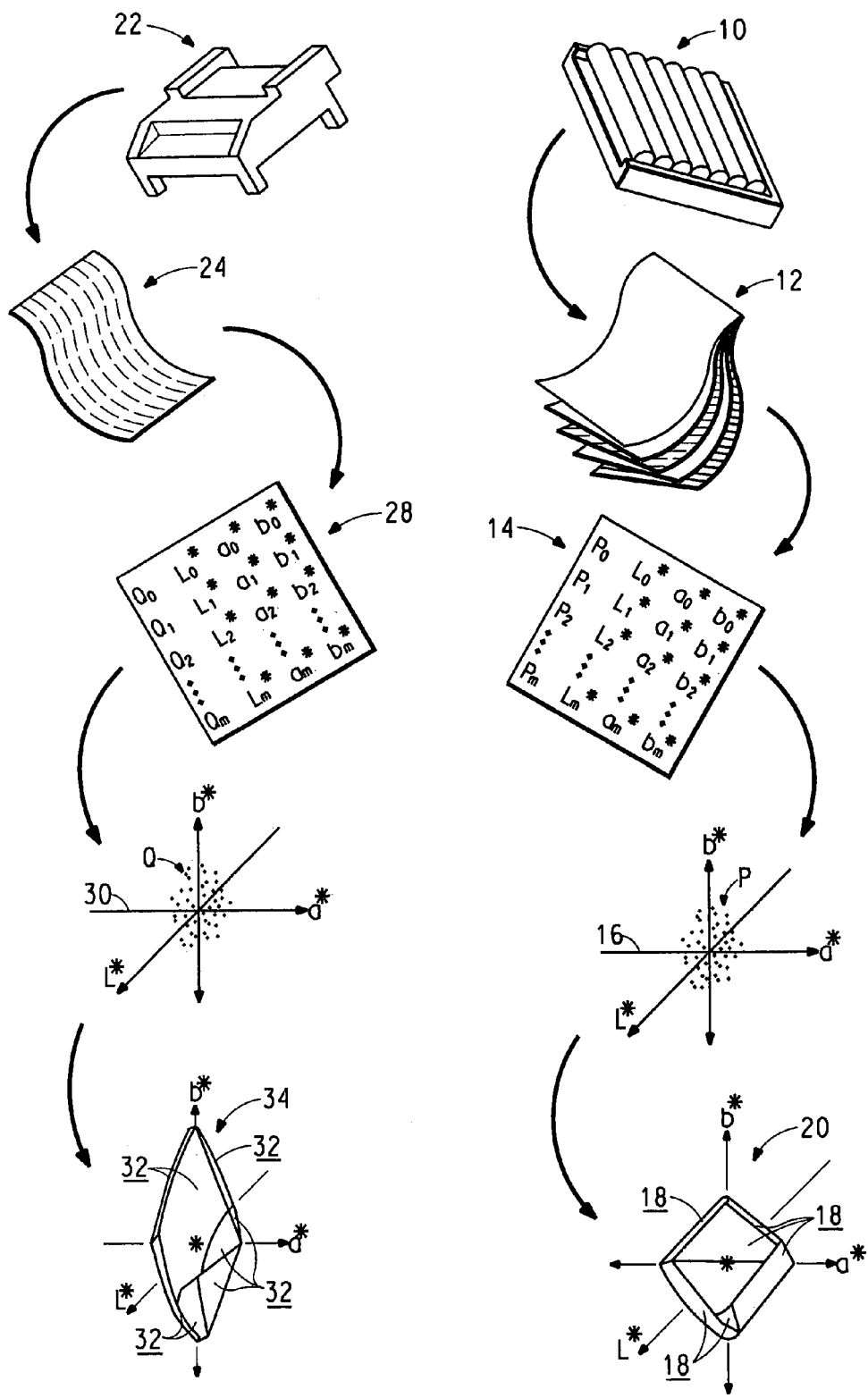
FIG. 1 is a stylized pictorial representation of a typical usage environment in which the method of the present invention finds utility.

Throughout the following detailed description similar reference numerals refer to similar elements in all figures of the drawings.

With reference to FIG. 1 shown is a stylized pictorial representation of a typical usage environment in which the method of the present invention finds utility. In FIG. 1 a first color generating apparatus is generally indicated by the reference character 10. For purposes of the discussion of this aspect of the invention the first color generating apparatus is implemented as an industrial screen printer, such as the device manufactured by Zimmer Machinery Inc., Spartansburg, S.C., and sold as "rotaSCREEN". The screen printer is operative to produce textile fabrics 12 having a pattern including one or more of a wide palette of colors able to be produced upon a given substrate medium.

A second color generating apparatus is generally indicated by the reference character 22. In the context of this discussion the second color generating apparatus 22 is implemented as a proofing printer. The proofing printer is used to produce relatively small quantities of a demonstration sample 24 that provide a designer with an example of a finished article without incurring the full expense of creating the array of screens needed by the screen printer.

One apparatus believed useful as the proofing printer is the production printer manufactured and sold by E. I. Du Pont de Nemours and Company as Artistri™ 3210 production printer. The ink jet printer utilizes a basic set of N number of various color inks to produce the colors in its palette on any of a variety of substrate media.

The problem attendant with the use of a proofing printer for such a purpose is to verify that the colors rendered by it on the demonstration sample 24 will be able to be reproduced on textile fabrics 12 by the screen printer.

One aspect of the method and program in accordance with the present invention solves this problem.

Figure 2:
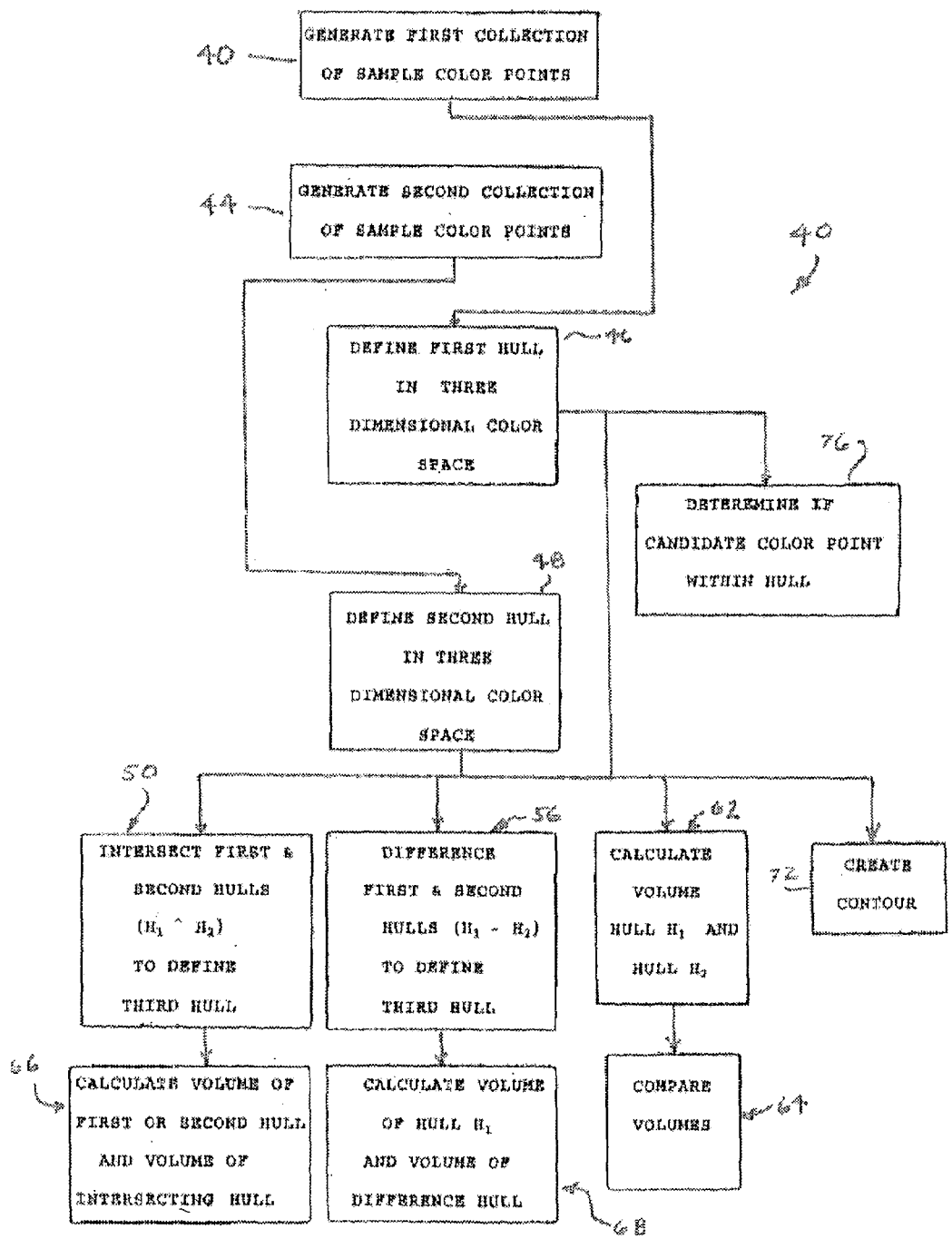
FIG. 2 is a block diagram indicating the method steps used in various embodiments of the computer-implemented method of the present invention.

FIG. 2 is an overall block diagram indicating the method steps of the method 40 of the present invention. As will be described in more detail herein the method 40 is implemented on a digital computer operating in accordance with a program of the present invention.

As indicated in the action blocks 42, 44 the method 40 in accordance with this aspect of the present invention may include the preliminary steps of generating a first set 14

(FIG. 1) of sample color points P and a second set 28 (FIG. 1) of sample color points, Q, if such sets are not already available from other sources. Generally, the sets 14, 28 of sample points contain a sufficient number of points to characterize the full color range of the particular color generating apparatus. Accordingly, the use of subscripts "n", "m" as depicted in the illustration of FIG. 1 is not to imply any relationship between the number of points in either set.

If not already available, the sets 14, 28 of sample color points may be generated using any of various available methods.

In some cases it may be adequate to measure the colors available for a specific task. When the numbers of colors is limited the simplest approach is to actually measure the L*, a* and b* coordinates of the CIE L*a*b* system of the colors.

Such measurements may be made by taking exemplars of the different colorants as applied to the substrate medium under consideration and measuring the reflectance using a spectrophotometer. Suitable for use as a measurement spectrophotometer is the device sold as the X-Rite SP6.

In the context of the present invention when it is assumed that mixing of colorants is possible, another approach is to experimentally prepare a sufficiently large set of colors so as to be able to define the expected set of possible colors which could be produced from these color primaries. Spectrophotometric measurements are made of the color sets. Ink jet printing of a target where the relative contributions of the process inks are varied in a systematic way is one example of this approach.

In some cases experimentally preparing a sufficiently large number of samples might present a significant cost in labor or materials. In such instances computer-implemented mathematical models are often employed which, based on optical characterization of the primary colorants, can generate a large number of colors resulting from "theoretical" mixtures of the primaries. Mathematical models built on relationships such as the Kubelka-Munk equations may be used for this purpose.

As depicted diagrammatically in FIG. 1 each color point in the set 14, 28 of sample points P, Q defines a location in at least a three-dimensional color space 16, 30, such as the CIE L*a*b* system of color coordinates discussed earlier. Other three-dimensional color spaces or even higher dimensional color spaces may be used. Each color point P in the first set 14 corresponds to a color in a color gamut able to be produced by the color generating apparatus 10. Likewise, each color point Q in the second set 28 corresponds to a color in a color gamut able to be produced by the second color generating apparatus 22.

Figure 3:
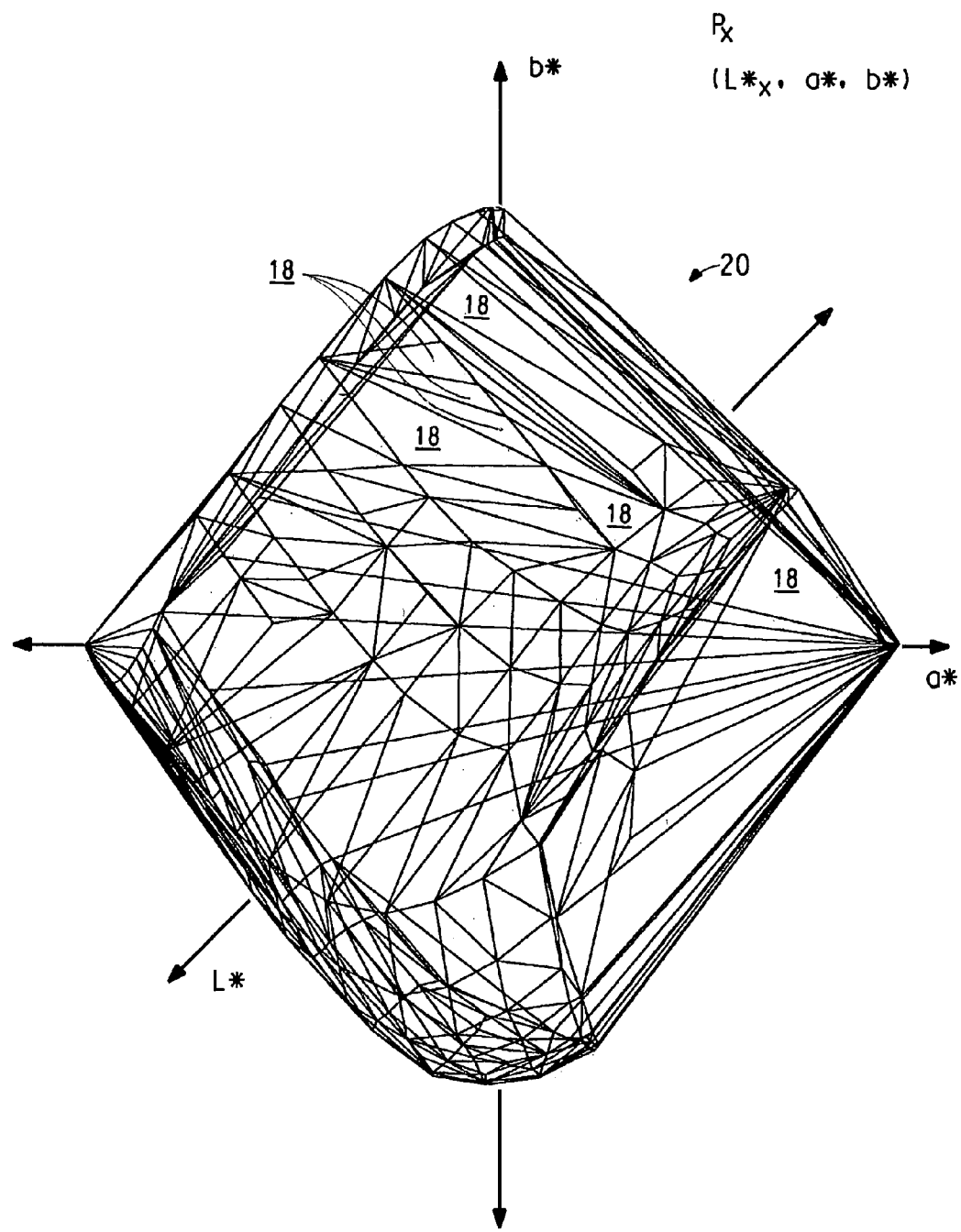
FIGS. 3 and 4 are stylized diagrammatic representations of a first and a second hull each representing the color gamut of color generating apparatus produced using a program implementing the method of the present invention.
Figure 4:
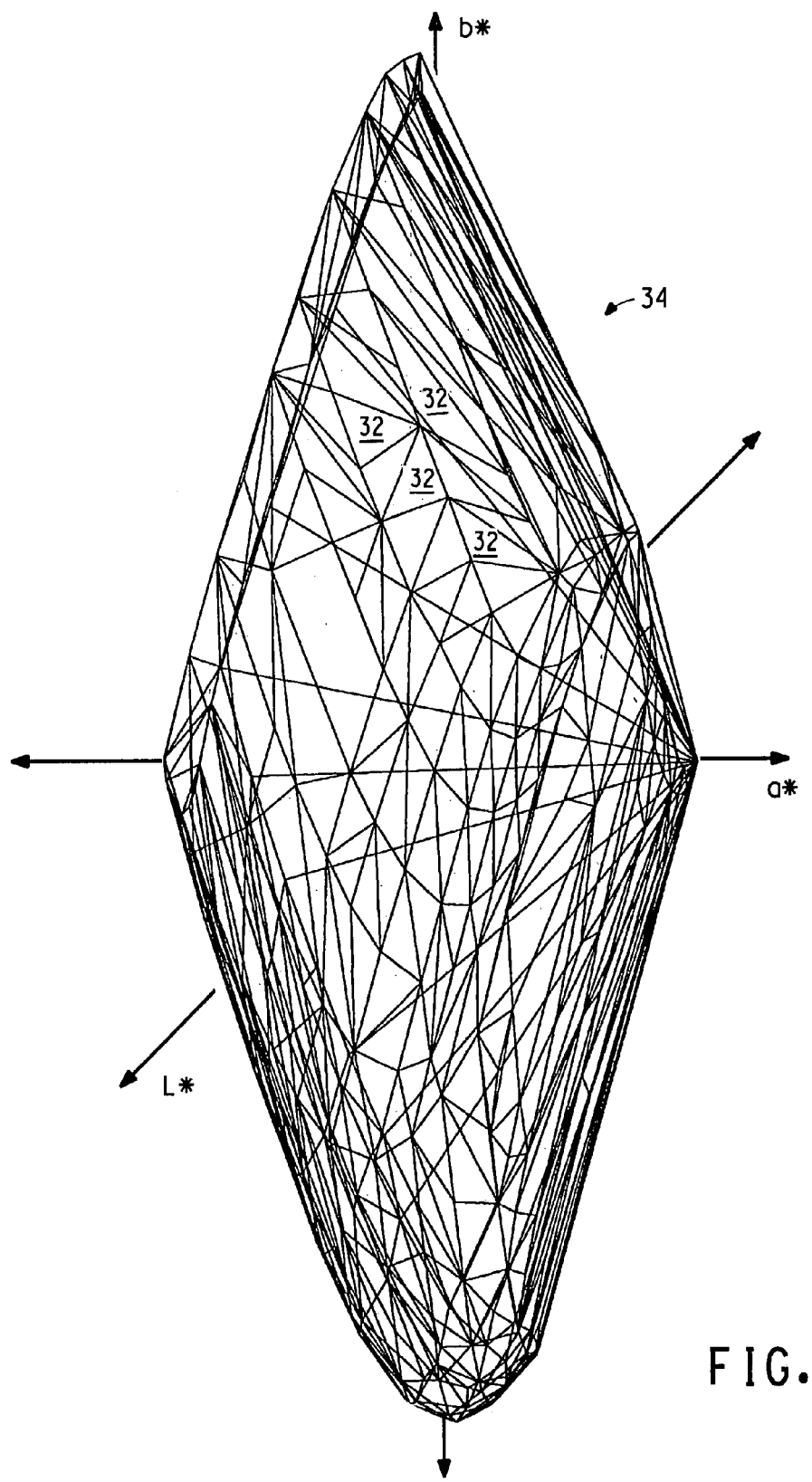

In the preferred implementation the method and program of the present invention, some or all of the sample color points in the first set 14 are used to generate a respective plurality of boundary surfaces 18 in the three dimensional color space. Similarly, using some or all of the sample color points in the second set 28 a second plurality of boundary surfaces 32 is generated in the three dimensional color space. These steps are indicated in action blocks 46, 48 in FIG. 2. Each plurality of boundary surfaces 18, 32 collectively defines a surface, or "hull", 20, 34 in the three-dimensional color space. The respective hulls 20, 34 generated from the first and second sets 14, 28 of sample color points are graphically depicted in FIG. 1. More detailed views of the pluralities of boundary surfaces 18, 32 that form the hulls 20, 34 are illustrated in FIGS. 3 and 4. (It is noted that only a portion of the surfaces 18, 32 are denoted by reference characters in FIGS. 3 and 4 for clarity of illustration.)

The set of all of the points disposed on the surface of or within the volume enclosed by the first confining hull 20 represent the color gamut able to be produced by the color generating apparatus 10. Thus, all of the color points P in the first collection 14 of sample color points are disposed on the surface of or within the hull 20. Similarly, the color gamut able to be produced by the color generating apparatus 22 is represented by the set of all of the points Q disposed on the surface of the second confining hull 34 or within the volume enclosed thereby, and all of the color points in the second collection 28 of sample color points are disposed on the surface of or within the hull 34.

Figure 5A:
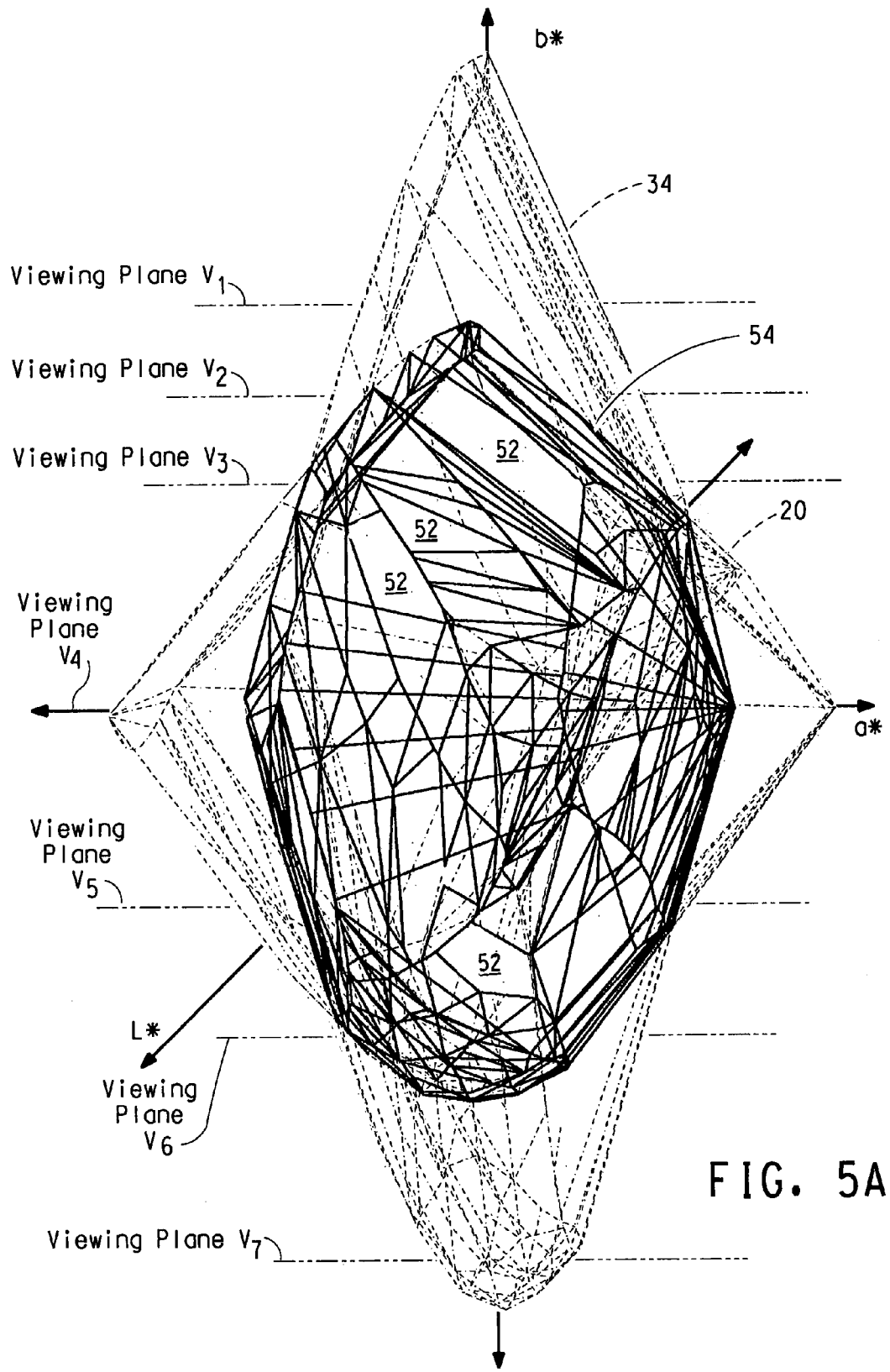
FIG. 5A is a stylized diagrammatic representation illustrating the intersection of the hulls of FIGS. 3 and 4, with the intersection being shown in full lines and the hulls of FIGS. 3 and 4 being shown dot-dash lines.
Figure 5B:
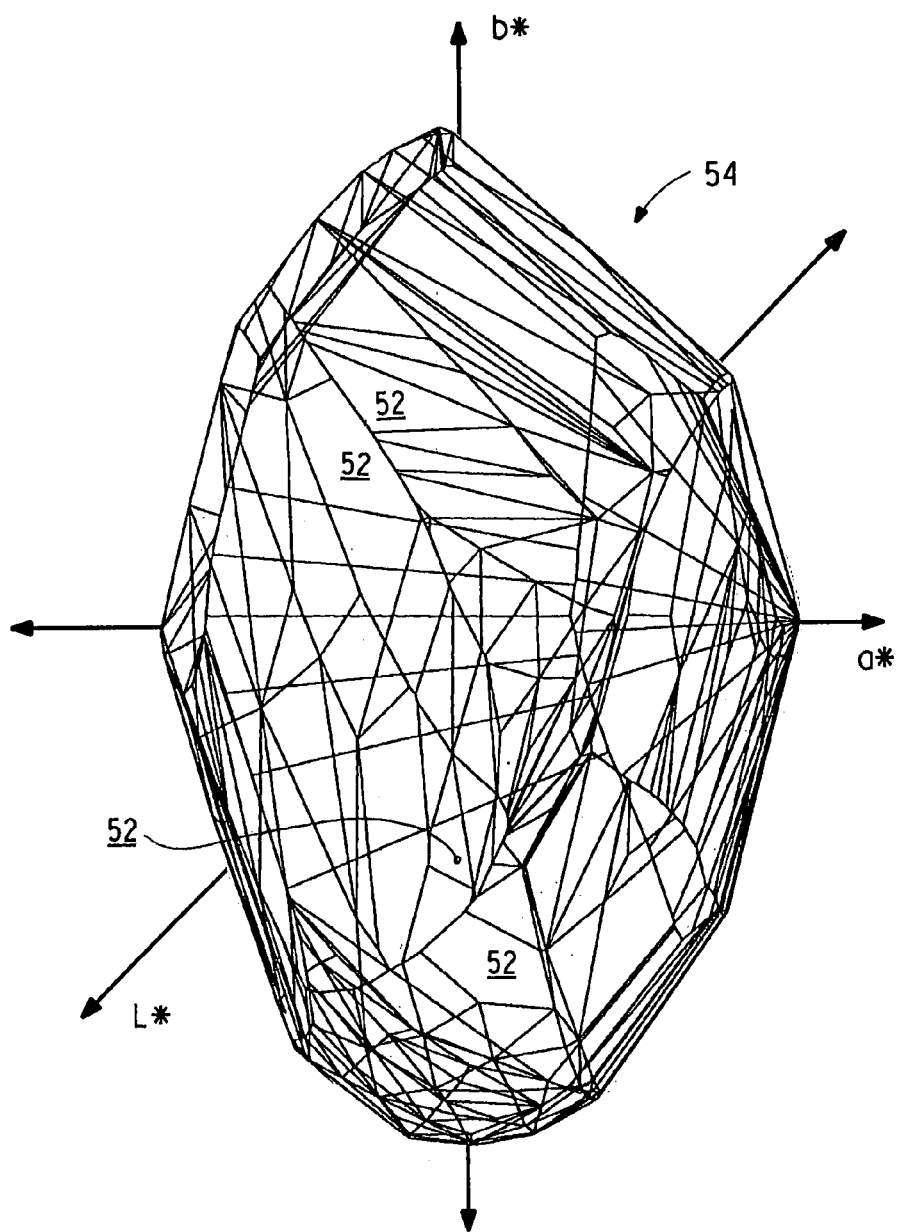
FIG. 5B is an isolated view of the intersection hull of FIG. 5A.

Overlap In accordance with a first aspect of the present invention, as indicated in the action block 50 in FIG. 2 and the diagrammatic illustrations of FIGS. 5A, 5B, the first and second hulls 20, 34 are combined to create a third hull 54 in the three-dimensional color space. In the preferred instance the third hull 54 is created from a plurality of boundary surfaces 52 that collectively define the third hull 54. A more detailed view of the hull 54 produced as a result of this combination of the hulls 20, 34 is illustrated in FIG. 5B. (Again, only a portion of the surfaces 52 are denoted by reference characters in FIG. 5B for clarity of illustration.) Each point disposed on the surface of the third hull 54 or within the volume enclosed thereby defines a color that is within both the first and the second color gamuts. The third hull 54 thus represents the regions of overlap of the first and second gamuts, that is, the overlapping gamut of colors that, if produced by the second color generating apparatus 22 (in this discussion, the proofing apparatus) will also be able to be produced by the first color generating apparatus 10 (in this discussion, the screen printing apparatus).

Generalizing The principles of the method 40 and program of the present invention utilized in comparing gamuts to verify that the colors produced by a proofing apparatus 22 are producible by an industrial printer 10 as explained above may be readily extended to the more general problem of comparing a first color gamut able to be produced by a given first color generating apparatus upon a given medium substrate with a second color gamut.

In accordance with the present invention a first and a second set of color points, each defining a location in at least a three-dimensional color space, may be used to create a respective confining hull in the color space. Each color point in the first set of color points may be derived from and correspond to a color produced by the first color generating apparatus so that the confining hull generated using that first set of color points represents the color gamut of the first color generating apparatus in that color space. The hull produced using the second set of color points represents the second color gamut.

As in the particular case discussed above, a third hull representing at least one region of overlap of the first and second hulls may be generated by combining the first and second hulls. The third hull representing a region of overlap thus provides a representation of those colors able to be produced by the first color generating apparatus that lie within the second color gamut. The combination may be achieved in any manner, although use of at least one Boolean operation, such as Boolean intersection, is preferred. Of course, one or more other Boolean operations that produce the equivalent result may be used.

Particular Applications The second gamut may be derived from a variety of sources. For example, the present invention may be used in a situation wherein the gamut produced by an ink jet printer having a palette comprising a first set of N number of inks may be compared to a second gamut representing the gamut able to be produced by the same ink jet printer having a palette comprising a second set of M number of inks. The second set may be a subset of the first set of N number of inks. Alternatively, one or more (but less than all) of the inks in the second set may be contained within the first set of N inks (the first and second sets intersect). As a further alternative, the first and second ink sets may have no members in common.

The present invention may also be used in a situation wherein the gamut produced by an ink jet printer having a palette comprising a first set of N number of inks may be compared to a second gamut representing the gamut able to be produced by a different ink jet printer having a palette comprising a second set of M number of inks. The second ink set may be an subset of the first set. The second ink set may contain members that intersect with the first set, or the second ink set may have no members in common with the first set.

The inks in the various ink sets may be produced by the same or different manufacturers, and/or, may be used to color the same or different substrates.

Exclusion In addition to creating a hull representing the overlap of the first and second gamuts (from wherever derived) the present invention may also be used to identify at least one region of exclusion between the first and second gamuts. This action is indicated in action block 56 in FIG. 2.

In accordance with another aspect of the present invention the first hull 20 and the second hull 34 may be combined in such a manner as to create a third hull that defines at least one region of exclusion between the first and second hulls. Again, in the preferred case, the third hull is collectively defined by a plurality of boundary surfaces 58. It is possible that the region of exclusion defined by the third hull 60 may contain portions that are disconnected from each other in the three-dimensional color space, as suggested by reference characters 60A, 60B in the detailed diagrammatic views of FIGS. 6A and 6B. Each point disposed on the surface of region of exclusion or within the volume enclosed thereby represents a color that is within the first gamut but not within the second color gamut. For clarity, only a portion of the surfaces defining the third hull 60 are denoted by reference characters in FIG. 6B.

The combination of the first and second hulls to produce the third hull representing the region of exclusion may be achieved in any manner, although a Boolean operation, such as difference operation, is preferred. Of course, one or more other Boolean operations that produce the equivalent result may be used. Using a Boolean difference operation to create the hull 60 representing the region of exclusion between a first and a second gamut is an order dependent operation. Thus, the hull 60 representing the difference of a first gamut from a second gamut is different from the hull representing the difference of the second gamut from the first gamut.

Volume In addition creating hulls representing regions of overlap and regions of exclusion, the principles of the present invention may be applied in other ways to compare a first and second color gamut.

Once the first 20 or second hull 34, as the case may be, is created, the volume in the three dimensional space enclosed by each of these hulls may be calculated and (if both volumes are calculated) compared. These action steps are indicated by the action blocks 62, 64 in FIG. 2.

As noted earlier the volume enclosed within a hull provides an indication as to absolute size of the gamut represented by the hull. A direct volumetric comparison therefore provides an indication as to the coloring capability of a given system.

The volumetric comparison may be more meaningful when applied in the manner indicated in action blocks 66, 68. In these cases the volume of at least one of the first or second hulls 20, 34 is calculated, as well as the volume of the third hull 54 representing the overlap of the first and second hulls (block 66) or the volume of all regions of the hull 60 representing the exclusion (difference) of the hulls (block 68).

A volumetric comparison between the volume of the overlapping hull and the volume of one of the first or second hulls provides a direct indication of the extent to which the gamut represented by the other hull—the "target"—overlaps the gamut represented by the one hull.

For example, calculating and comparing the volumes of the first hull 20 and the volume of the third (overlapping) hull 54 provides an indication as to the extent to which the second gamut (the "target" gamut, represented by the second hull 34) is overlapped by the first gamut represented by the hull 20. Conversely, calculating the volumes of the second hull 34 and the volume of the third hull 54 provides an indication as to the extent to which the first gamut (represented by the first hull 20) is overlapped by the second gamut represented by the hull 34.

In the case of the difference of a second hull from a first hull (i.e., $hull_1-hull_2$), comparing the volume of the difference hull to that of the first hull provides an indication as to how much of the first hull can not be reached by the second hull.

Contour In accordance with yet another embodiment of the present invention, once the first and second hulls are created a qualitative measure of the degree of alignment between the first and second hulls may be made. This action is indicated in action block 72 in FIG. 2.

For each of a plurality of locations along a predetermined reference line in the color space a visual display of the contour produced by the intersection of one or both the first and the second hulls with a plane perpendicular to that reference line may be generated. A comparison among the various contours views so produced may be used to ascertain qualitatively the degree of alignment of the first and second hulls along the reference line. Any arbitrary reference line may be chosen, although it is convenient to utilize one of the axes of the color space.

This aspect of the invention may be best understood with reference to the series of views shown in FIGS. 7A through 7F. In these views the predetermined reference line in the color space is the b* axis (the "vertical" axis in the plane of FIG. 5A). The selected viewing locations along b* axis are indicated as viewing planes $V_1$ through $V_7$. The displays respectively generated along those viewing planes are respectively shown in FIGS. 7A through 7G and illustrate the contours of the first and second hulls in the L*-a* plane (FIG. 7D) and in plane parallel to the L*-a* plane (FIGS. 7A–7C, 7E–7G). The contour of the first hull 20 is indicated in solid lines, while the contour of the second hull 34 is indicated in dashed lines.

These views of the various contours provide another way of determining gamut overlap.

Point In Gamut Yet another useful tool in gamut comparison is the determination as to whether a predetermined candidate color corresponding to a predetermined point in the three-dimensional color space lies within the color gamut able to be produced by a color generating apparatus upon a given medium. For example, with reference to FIG. 3, it is often important to determine whether a point, as the color point $P_x$ having the coordinates ($L^*_x$, $a^*_x$, $b^*_x$) is within the gamut represented by the hull 20.

A feature of the present invention is that, prior to the determination, the collection 14 of sample color points and the predetermined color point $P_x$ are scaled in accordance with a scale factor determined from the values in the color space of the sample color points and the predetermined color point.

If a programmed computer executing the program is operating using integer arithmetic, scaling the points (the sample data collection together with the point of interest) in accordance with a scale factor derived from all of these points themselves maximizes the accuracy of the computer implementation of the determination as to whether the point of interest is included within the hull.

DETAILED DISCUSSION OF THE COMPUTER IMPLEMENTATION OF THE PRESENT INVENTION

Examples of portions of a program contained on a computer-readable medium and useful in configuring a computing system to implement the method of the present invention (sometimes referred to herein as "Gamut Visualizer") are set forth in the following sections of this application.

The code that follows may be implemented on a computing platform which is able to execute programs written using the Visualization ToolKit (or, "VTK") and which supports OpenGL graphics. Such a computing platform may be a personal computer operating under a Microsoft Windows Operating System, Windows '95 or higher (e.g., Windows NT/2000), or under a Unix operating system (e.g., SGI Irix.), and associated display.

Generally speaking, the program implementing the present invention is written in two languages, Tcl/Tk and C++. Details about the Tcl/Tk are set forth in a number of texts and guides, including Ousterhout, Tcl and Tk Toolkit, 1994, Addison-Wesley, Reading, Mass. A basic reference to the C++ language is Stroustrup, Bjarne, The C++ Language, Third Edition, 1997, Addison-Wesley, (ISBN (0-201-88954-4).

The code also utilizes objects from the Visualization ToolKit. The Visualization ToolKit is an open source, freely available software system for three-dimensional computer graphics, image processing, and visualization. Professional support and products for VTK are provided by Kitware, Inc. (Clifton Park, N.Y.

The Tcl interpreter used herein is a wrapper for C++ implementation of VTK, meaning that VTK calculations can be done with commands which extend the standard Tcl language.

VTK is an "object oriented" software development kit for scientific data visualization. Its functionality is implemented in the form of object class libraries. To perform a task, the appropriate objects are created as "instances" of the related class library. These objects are connected in sequence into a "pipeline" which executes when needed.

The various specific VTK object classes used in the execution of the instant invention are indicated in the text of the listings that follow with the letters "vtk" as the first three characters on a line of code.

There are six basic files which comprise the program implementing the present invention. These files include:

gamuts.tcl—The front end code which is executed first. It sets up the graphics and executes code files "gamuts_cmds.tcl" and "gamuts_int.tcl".

gamuts_cmds.tcl—It is in this module of the code where most of the Tcl procedures are defined.

gamuts_int.tcl—Most of the code which defines the graphical user interface (GUI) resides here, with the exception of interactors tied to the commands, such as the "slider" tied to the "con" (contour) command.

colors.tcl—The color names which are available are defined here.

hull.exe—is an executable binary, with source written in C++, which calculates convex hulls.

inpoly.exe—is an executable binary, with source written in C++, which does the "point in polyhedron" test for the procedure "adpInPoly".

The C++ executable binary "hull.exe" is for a program written in ANSI C++ program that computes the convex hull of a point set in general dimension. The input is a list of points and the output is a list of facets of the convex hull of the points, each facet presented as a list of its vertices represented as integers which index into the list of points. The program can also compute Delaunay triangulations and alpha shapes, and volumes of Voronoi regions.

The program "hull" is available through the repository Netlib, maintained by AT&T Bell Laboratories (Murray Hill N.J., USA; Eric Grosse, editor) and through the University of Tennessee and Oak Ridge National Laboratory (Knoxville Tenn., USA; Jack Dongarra, editor). The collection is replicated at several sites around the world, automatically synchronized, to provide reliable and network efficient service to the global community. It was originally written by K. Clarkson, Computing Sciences Research Center, Bell Laboratories.

The C++ executable binary "inpoly.exe" is adapted with relatively few changes from the code present in *Computational Geometry In C, 2nd Ed*, J. O'Rourke, Cambridge Univ. Press 1998, pages 245–252.

VTK is layered upon the more basic OpenGL three-dimensional interactive graphics libraries for lower level graphics services. OpenGL is a international de facto standard for three-dimensional graphics. A standard reference on this topic is *OpenGL Programming Guide Third Edition*, Addison Wesley 1999.

The GUI ("Graphical User Interface") is implemented in Tcl using the Tk toolkit which is an extension to Tcl.

Architecturally, a structure chart of a program implementation of the present invention appears as follows:

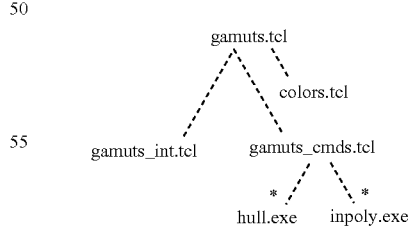

A line connecting two files means that code in the file on the upper end of the line runs the file on the lower end. The Tcl "bidirectional pipes" are indicated as bold lines and an asterisk.

It should be understood that the code segments which are set forth herein have been simplified by removal of error checking and functions non-essential to the explication.

Parts of the code segments set forth are in the original Tcl language. However, other parts of the code have been simplified for presentation or replaced with simple pseudo code. Portions of the code presented herein have been simplified for presentation or replaced by comments summarizing code functions. Comments are indicated by "##" in columns one and two of each line of the comment.

The code implementing the following commands included herein are:

"hul" which calculates convex hulls, an implementation of blocks 46, 48 (FIG. 2);

"int" command which calculates gamut interections, an implementation of block 50 (FIG. 2);

"dif" command which calculates gamut differences, an implementation of block 56 (FIG. 2);

"vol" command which calculates gamut volumes, useful in the implementation of blocks 62, 64, 66 and 68 (FIG. 2);

"con" command which displays gamut contours, an implementation of block 72 (FIG. 2); and "adp" command which determines whether a test point is within a gamut, an implementation of block 76 (FIG. 2).

An example of the manner in which objects are displayed is also included.

Generation of A Hull The mathematical description of a three-dimensional hull (e.g., the hull 20, 34, FIG. 1), the surface of which represents the boundary of a color gamut, is generated from the sample color points (blocks 46, 48, FIG. 2).

In the most preferred instance the hull is described by a technique commonly known as a "convex hull". However, in some instances, the hull may be described by a technique termed "alpha hull", as will be discussed.

A convex hull is the boundary of the smallest convex set containing the data points. A set is convex if and only if the straight line segment connecting two data points in the set is also contained in the set. The physical meaning of this is that any linear interpolation between two colors in the gamut is also contained in the gamut.

The "hul" segment of the Tcl program code calculates a convex hull from a list of sample color points contained in a file "Inputfile".

The Structure Chart of the procedures used for the "hul" command is as follows:

```
       hul- front end of routine
                 |
      HulMesh- main driver for calculations
                 |
   InputFile- reads sample color points (14, 28)
   ------------------"hul command"------------------
proc hul {name color {opacity 1}} {
Determine dirname = directory name
Determine HulName = gamut name
Determine suffix = one of {.txt. csv .vtk}
"Inputfile" is name of procedure to read in data
"HulMesh" is the controlling procedure for making a hull
      HulMesh InputFile $dirname $HulName $suffix $color $opacity
}
proc HulMesh {input dirname name suffix color opacity} {
Open a bidirectional pipe to external program hull.exe
      set command hull.exe
      catch [{open "|$command " r+}] pipe
Read in the sampled color points
      $Input $dirname $name $suffix
In the remaining code the input sample points are passed
to hull.exe which returns the convex hull in the form of
triangles whose vertices are a subset of the sampled points.
The convex hull is put into a polygonal data object named
${name}GamPolyData where "${name}" is the gamut name.
```

-continued

```
DataIn is the symbolic name of the input data
      upvar #0 ${name}DataIn DataIn
      set ${name}Datag ${suffix}
      set ${name}Source "hul"
Get number of sampled color data points
      set numpts [$DataIn GetNumberOfPoints]
Set up a container for the hull's triangles
      set triangles ${name}HulCellArray
      vtkCellArray $triangles
Send sampled color data points to hull.exe
      puts $pipe "% 0 0"
      for { set i 0 } { $i < $numpts } { incr i } {
            set point [$DataIn GetPoint $i]
            puts $pipe "$point"
      }
      puts $pipe "X"
      flush $pipe
Get the triangles for the hull back from hull.exe
      gets $pipe line    ;# skip first line
      while {[gets $pipe line] >= 0} {
            $triangles InsertNextCell 3
            eval $triangles InsertCellPoint [lindex $line 0]
            eval $triangles InsertCellPoint [lindex $line 1]
            eval $triangles InsertCellPoint [lindex $line 2]
      }
      catch {close $pipe}
All the points and triangles for a hull are stored here
      set polydata ${name}GamPolyData
      vtkPolyData $polydata
            $polydata SetPoints [$DataIn GetPoints]
            $polydata SetPolys $triangles
Add surface normals and display the gamut's hull
      addGamut $name $r $g $b $opacity $polydata
      $triangles Delete
}
```

The convex hull can also be calculated using a variety of published algorithms such as those described in *Computational Geometry*, M. de Berg et al, Springer 1998, pp 235–250, and *Computational Geometry In C 2nd Ed*, J. O'Rourke, Cambridge Univ. Press 1998, pp 101.

Figure 8A:
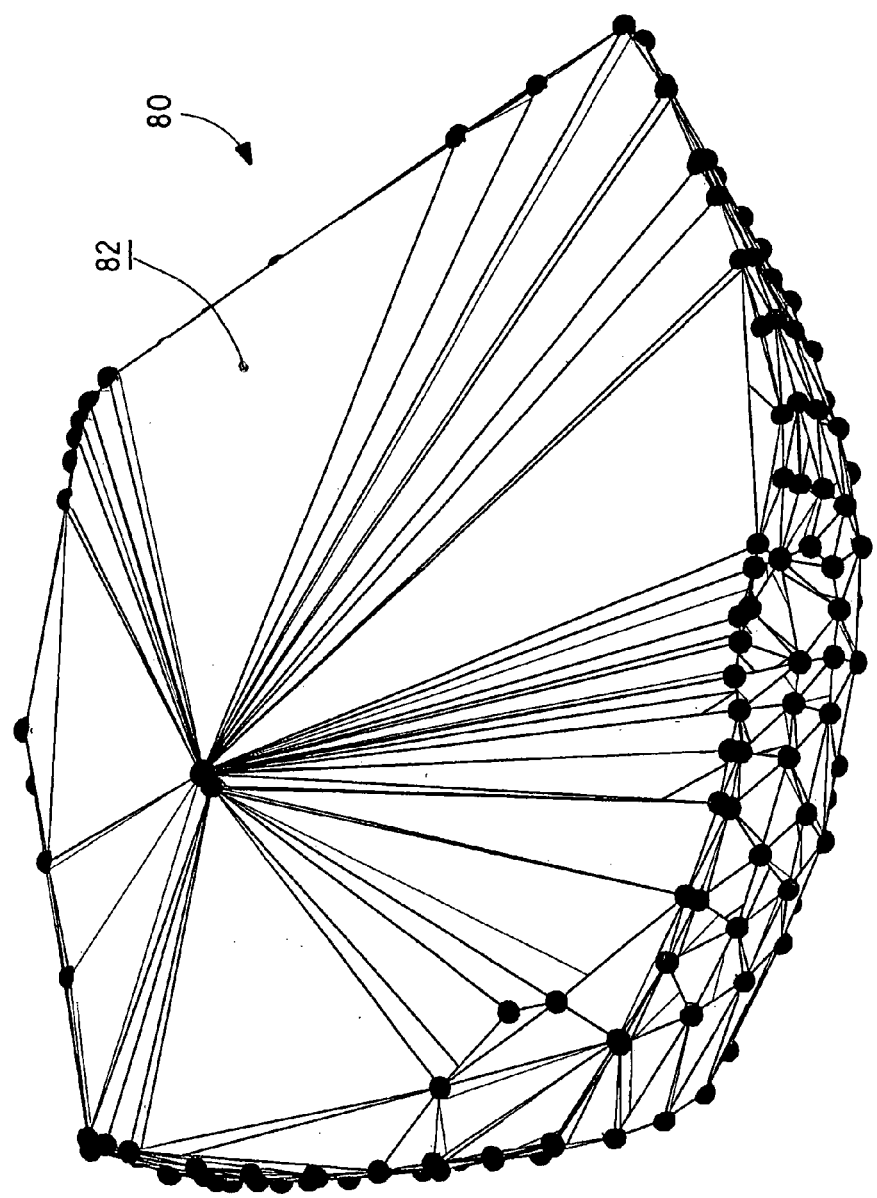
FIGS. 8A and 8B are, respectively, stylized diagrammatic representations of a convex and an alpha hull representing the same color gamut.

Generally, a convex hull is always used as the initial guess for the representation of the hull. The convex hull 80 shown in FIG. 8A is a diagrammatic representation of an arbitrary data set. The presence of the large empty portions along the upper hemisphere 82 of the hull 80 lead a skilled observer to conclude that the particular surface generated does not well fit the boundary sample color points. The color generating system may not be adequately described by a convex hull. In such an instance, an "alpha hull" is then employed.

The alpha hull is derived from a collection of points, lines, triangles, and tetrahedra known as an "alpha shape". "Alpha shapes" are discussed in H. Edelsbrunner and E. P. Mucke, "Three-dimensional alpha shapes", ACM Trans. Graphics 13 (1994), 43–72 and A. Bowyer. "Computing Dirichlet Tesselations", The Computer Journal, 24(2), pp 162–166, February 1981.

The concept of alpha shapes is an approach to formalize the intuitive notion of "shape" for spatial sets. Given a finite point set a family of shapes can be derived from the triangulation of the point set. There is a bounding sphere for each tetrahedron in a three dimensional Delaunay triangulation of the input sample points which contains the four vertices of the tetrahedron and no other points. A tetrahedron is removed from the Delaunay triangulation if the radius of its bounding sphere is greater than a real parameter called alpha. After tetrahedra removal what remains is a collection of points, lines, triangles, and tetrahedra which together form the alpha shape corresponding to the parameter alpha. As used herein, the term "alpha hull" refers to that surface that is the largest remaining three-dimensional surface which is topologically equivalent to a sphere. A surface is topologically equivalent to a sphere if and only if it can be made into the surface of a sphere with transformations that may stretch, bend, twist, or compress the surface without tearing, puncturing or inducing self-intersection. A basic reference on topology in geometric modeling is *Geometric Modeling*, Second Edition, M. Mortenson, John Wiley & Sons Inc, 1997, pages 281–310.

It is convenient to use available software to calculate the alpha shape. Such software includes "hull" software used in hull and vtkDelaunay3D. The VTK object class vtkDelaunay3D is preferred because a smoother surface is usually obtained.

Figure 8B:
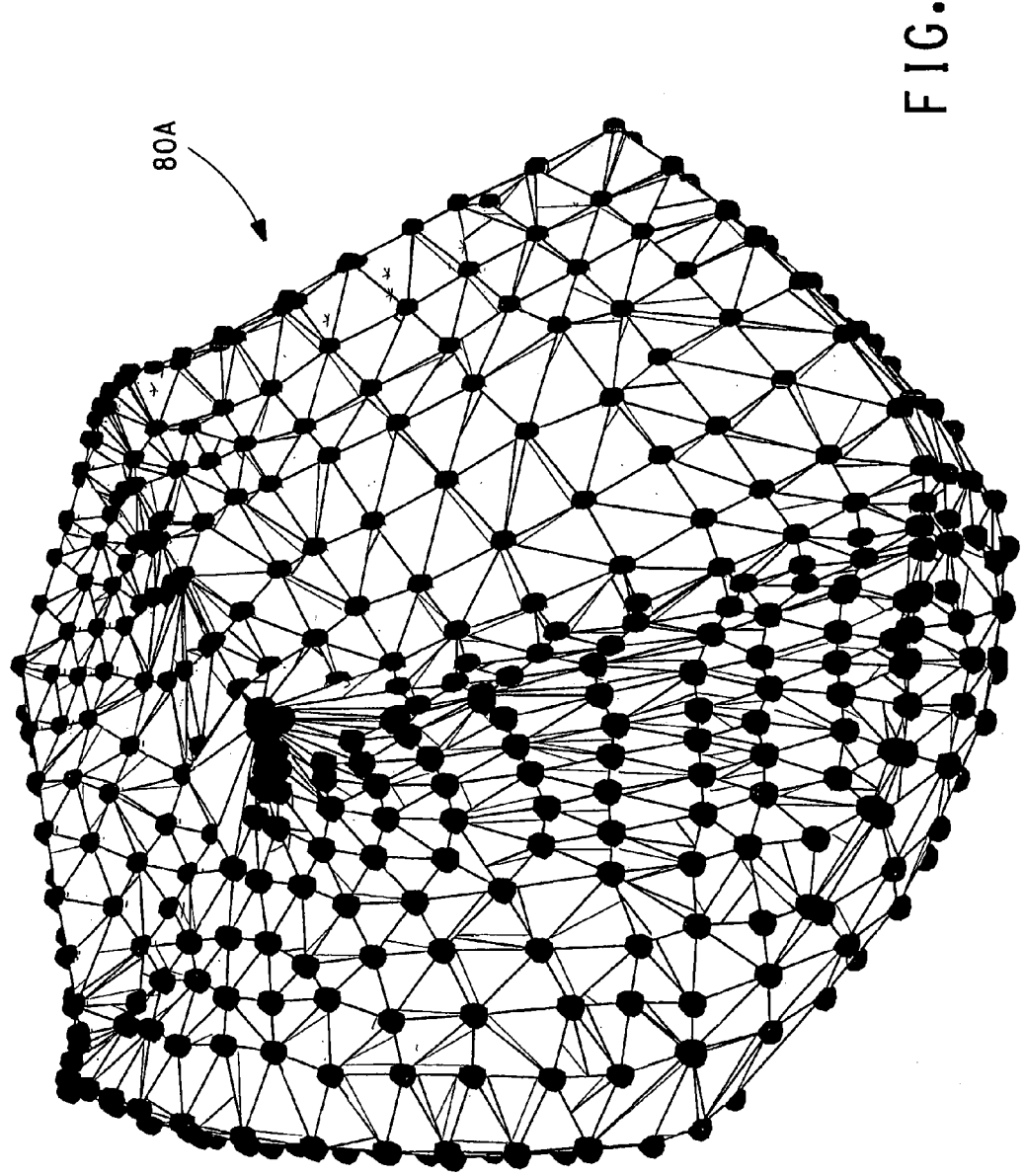

The alpha hull representation of the same data set is shown at 80A in FIG. 8B.

It may be desirable in the practice of this invention to use a plurality of routines to calculate a hull from a set of color data. The routine(s) sort through the color data and construct a hull from only the outer-most points. The points in the color set need not be pre-selected to be on the surface of the hull, and not all points will necessarily be used as vertices of the hull. In other words, the color set should include the most colorful points, but need not include only those points.

Standardization of Vertex Order and Volume Calculation Before reviewing the code for the generation of the regions of overlap and regions of exclusion of two hulls (blocks 50, 56), two aspects of the code implementation it should be discussed, viz. standardization of vertex order and volume calculation.

1. Vertex Order It is believed preferable to list the coordinates of the surface triangles of the hull in counter-clockwise order as viewed from outside the hull. The vertices of the triangles returned from "hull.exe." and stored in the file "set polydata ${name}GamPolyData" are listed in a consistent manner, but that manner could be either all clockwise or all counterclockwise. In order to make all the triangles have normals that point outward, the normal to the plane through a first triangle is chosen so that when the fingers of the right hand are curled in the direction of the vertices, the thumb points in the direction of the normal. Then the vertices for a second triangle are checked against the plane equation for the first triangle. If they are on the same side of the plane as the normal, the sequence in which the vertices are listed for all triangles is reversed; otherwise they are in proper order and left unchanged.

The program routine "Boolflip" effects this reversing of vertices and "flipping" of normals for the routine that generates the hull representing the regions of overlap and regions of exclusion.

```
-----------------"Boolflip"-----------------
$norm is a vtkPolyDataNormals object that contains the
normals, triangles, and points for a hull
list of point id's for a triangle
            set idl FlipIdList
            vtkIdList $idl
performs various plane operations
            set plane FlipPlane
            vtkPlane $plane
creates a plane
            set plsrc FlipPlaneSource
            vtkPlaneSource $plsrc
get the polydata
            set poly [$norm GetOutput]
get point list for triangle 0
            $poly GetCellPoints 0 $idl
```

-continued

```
p0,p1,p2 are id's for triangle vertices
            set p0 [$idl GetId 0]
            set p1 [$idl GetId 1]
            set p2 [$idl GetId 2]
Make a plane and get it's normal using the triangle's
points
            set origin [$poly GetPoint $p0]
            eval $plsrc SetOrigin $origin
            eval $plsrc SetPoint1 [$poly GetPoint $p1]
            eval $plsrc SetPoint2 [$poly GetPoint $p2]
            $plsrc Update
            set normal [$plsrc GetNormal]
Update vtkplane origin and normal
            eval $plane SetOrigin $origin
            eval $plane SetNormal $normal
            $plane Modified
Loop through all the points and find one that is
different from the vertices of the first triangle
            set numpts [$poly GetNumberOfPoints]
            for {set j 0} {$j < $numpts} {incr j} {
            if { $j != $p0 && $j != $p1 && $j != $p2 } {
                set point [$poly GetPoint $j]
                set l [lindex $point 0]
                set a [lindex $point 1]
                set b [lindex $point 2]
Test this point to see if it is outside the hull by
evaluating the implicit equation for the plane
                set val [$plane EvaluateFunction $l $a $b]
                if {$val > 1.0e-6} {
Flip all the normals. This assumes all normals are
consistently oriented.
                    $norm FlipNormalsOn
                    $norm Update
                }
                break
            }
        }
```

2. Gamut Volume Calculation The volume contained within a hull is calculated in blocks 62, 64 and 66. A well-known method for calculating the volume of a polyhedron is described in Alyassin, A. M. et al, "Evaluation of new algorithms for the interactive measurement of surface area and volume", Med Phys 21(6) 1994.

In this method the volume is calculated employing the "Divergence Theorem" of vector calculus, $$\text{Volume of a solid} = \frac{1}{3} \int_s R \cdot N^* dA$$

where:

"$\int_s$" denotes the surface integral;
dA=area of a surface element,
N=unit normal to surface element,
R=position of the surface element,
R·N=scalar product of vectors R, N.

A discrete version of this theorem, described in the Alyassin reference, provides the basis of an algorithm used in the Vtk object "vtkMassProperties". The "vol" segment of the use of this Vtk object for calculation of volume is a preferred embodiment.

In simplified form the algorithm works as follows:
Set volx=voly=volz=0
Loop through the triangles
For each triangle calculate
    (Nx, Ny, Nz)=triangle's unit normal
    dA=triangles area
    (x, y, z)=triangle's center
    volx=volx+(dA*x*Nx)
    voly=voly+(dA*y*Ny)
    volz=volz+(dA*z*Nz)

Let kx, ky, kz (kx+ky+kz=1) be the weighting factors described in Alyassin. Then, $$\text{volume (of the gamut)} = (kx^*volx) + (ky^*voly) + (kz^*volz)$$

---
------------------"vol command"------------------
```
vtkMassProperties massprop
proc vol {name} {
global ${name}Datag
    massprop SetInput [${name}GamPolyDataNormals GetOutput]
    return "# volume of $name = [massprop GetVolume]"
}
```
---

Another well known method for calculating the volume of a polyhedron is disclosed in Goldman, R. N., "Area of Planar Polygons and Volume of Polyhedra" in Graphics Gems II, pp 170–171, 1991, Edited by James Arvo.

Overlap of Hulls The region of overlap of two hulls (block 46) is performed by creating a new hull 54 (FIGS. 5A, 5B) that is the Boolean intersection of the first and second hulls 20, 34. In the preferred instance of the implementation of the present invention the two hulls must be convex and the normals for both convex hulls must point outward.

The algorithm for calculating overlap recognizes that a plane is a surface defined by the equation:

$$a^*x + b^*y + c^*z - d = 0$$

The halfspace corresponding to this plane can be defined by the inequality $$a^*x + b^*y + c^*z - d \leq 0.$$

This includes the plane which is the boundary of the half space.

A point (x, y, z) is inside the halfspace if it satisfies the inequality. Otherwise it is outside.

A three dimensional convex set and its boundary is equivalent to the intersection of a set of halfspaces. Each halfspace corresponds to the plane through one of the triangles in the convex hull which bounds the convex set.

To define overlap, a large rectangle representing each plane is "clipped" against all other planes to form the polygons of the new convex hull. "Clipping" a polygon with a plane means to cut off the part of the polygon which lies outside of the halfspace corresponding to the plane being used for clipping.

The "int" command implements the creation of the gamut overlap. The bounding planes for each convex hull are converted to a form in which each plane is represented by a point in the plane and the normal to the plane. The boundary planes for both convex hulls are then combined into one set which is passed to the vtkHull object.

When the GenerateHull method within vtkHull is executed, a set of polygons defining the overlap hull is calculated. The resulting overlap hull can then be treated like any other hull. It could be displayed (e.g., FIGS. 5A, 5B) or subjected to further operations. In fact, the code segment "int" invokes vtk "Massprop" and calculates the volume of the overlapping hull and the volume of first hull, and the percentage of the volume of the overlapping hull to the volume of the first input hull.

The structure chart showing procedures used for the "int command" is as follows:

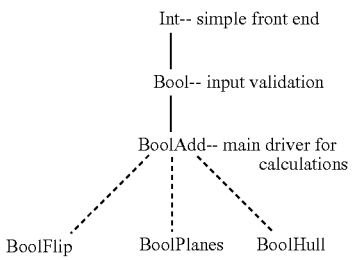

"BoolPlanes" calculates points and normals which define the planes bounding a hull. "BoolHull" calculates the convex hull for the "int command". "BoolFlip" standardizes normals of triangles forming a hull if they don't point outwardly, as discussed above.

The code for the "int command" is as follows:

---
------------------"int command"------------------
```
proc BoolAdd {op name name2 color} {
op can be either int or dif. The
code shown here is only for "int", while "dif" is
reproduced later herein.
Make a name for the new gamut.
nameb = ${name}^${name2} for intersection
Container for the output gamut's polygonal data
    set polydata ${nameb}GamPolyData
    vtkPolyData $polydata
Polygonal data and normals for the input gamuts
    set norm(1) ${name}GamPolyDataNormals
    set norm(2) ${name2}GamPolyDataNormals
NOTE: The result of an intersection of convex hulls is
convex. Also, a convex hull is the intersection of
planes which define halfspaces. Any plane can be
completely specified by a point in the plane and a
vector normal pointing outside of the halfspace defined
by the plane. Each triangle in a convex hull
corresponds to a plane.
        for {set i 1} {$i <= 2} {incr i} {
Reverse direction of input gamut's normals if necessary.
They must point outward
            set norml(1) $norm($i)
            BoolFlip 1 norml
BoolPlanes calculates a point and a normal defining each
bounding plane for a hull. These are put into $points
and $normals which are temporary containers.
            set norml(1) $norm($i)
            BoolPlanes 1 norml $points $normals
        }
Create a set of planes and normals defining the output
gamut from the totality of points and normals
from the input gamuts
        set planes BoolPlanes
        vtkPlanes $planes
            $planes SetPoints $points
            $planes SetNormals $normals
Calculate the hull for the output gamut using vtkHull
        BoolHull $planes $polydata
Add new gamut
    addGamut $nameb $color 1 $polydata
Calculate the volumes of the gamuts being operated on by
int and calculates the volume of the intersection gamut.
Procedure massprop is used to calculate volumes. Then
print out percentages which quantify gamut alignment.
    massprop SetInput $polydata
    set volb [massprop GetVolume]
    massprop SetInput [$norm(1) GetOutput]
    set vol [massprop GetVolume]
    set perc [format "%6.2f" [expr 100. * $volb / $vol]]
    massprop SetInput [$norm(2) GetOutput]
    set vol2 [massprop GetVolume]
    set perc2 [format "%6.2f" [expr 100. * $volb / $vol2]]
        return " # Volume of $nameb = $volb\n\
```

-continued

```
        #       ${perc}% of $name ($vol)\n\
        #       ${perc2}% of $name2 ($vol2)"
}
proc BoolHull {planes polydata} {
Calculate the convex boundary with vtkHull
Container for output hull
        set pd BooPolyData
        vtkPolyData $pd
vtkHull calculates the output convex hull by clipping
every plane with every other plane
        set hull BooHull
        vtkHull $hull
                $hull SetPlanes $planes
                $hull GenerateHull $pd −100 200 −200 200 −200 200
Convert non-triangles in the new hull to triangles
        set tri BooTriangleFilter
        vtkTriangleFilter $tri
                $tri SetInput $pd
Remove duplicate points and triangles which have
degenerated into lines
        set cpd BooCleanPolyData
        vtkCleanPolyData $cpd
                $cpd SetInput [$tri GetOutput]
Insert points and polygons into new gamut
        $polydata SetPoints [[$cpd GetOutput] GetPoints]
        $polydata SetPolys [[$cpd GetOutput] GetPolys]
        return
}
```

It should be appreciated that although the Boolean operator intersection is the preferred method of computing the overlap of the first and second hulls, another Boolean operator or combination of operators that produce the equivalent result may be used. For example, A^B could be replaced by the equivalent expression (A|B)|(A|B) where A|B is equivalent to −(A^B) [−X is everything excluded from X]. The operator "|" is frequently referred to as "NAND". As another example, the result equivalent to intersection may be achieved using union "U", as follows: A^B=(A$^c$ U B$^c$)$^c$ where the symbol "$^c$" represents the compliment.

Figure 6A:
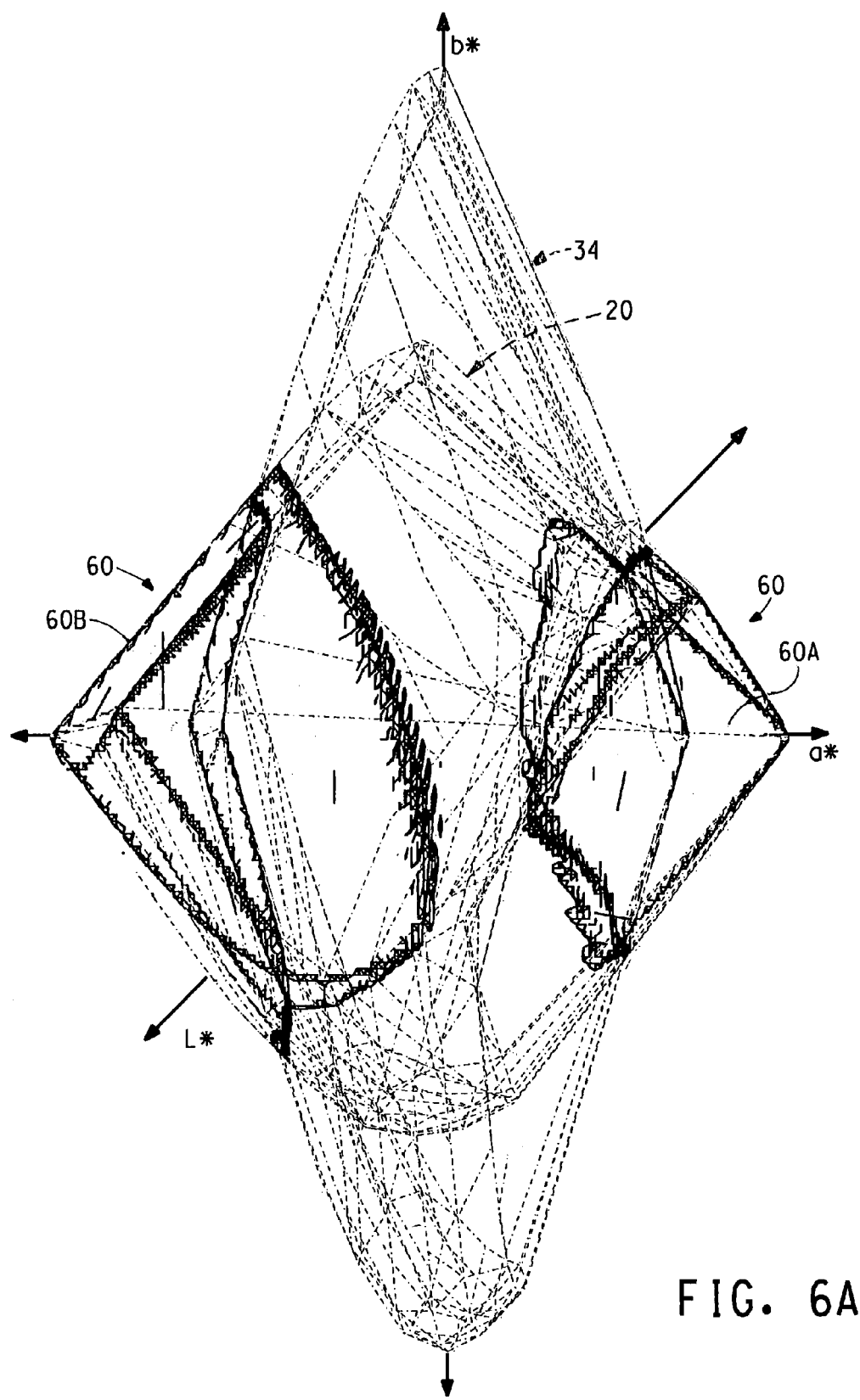
FIG. 6A is a stylized diagrammatic representation illustrating two segments comprising the difference between the hulls of FIGS. 3 and 4, with the difference hull segments being shown in full lines and the hulls of FIGS. 3 and 4 being shown dot-dash lines.
Figure 7A:
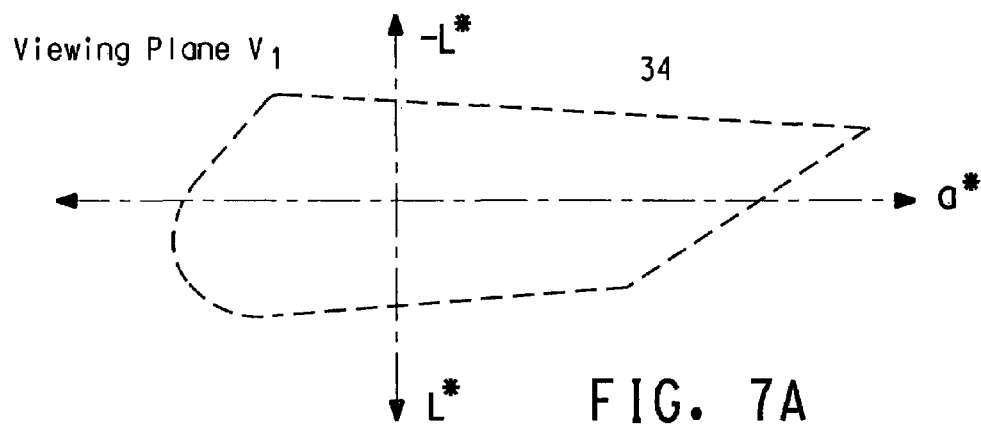
FIGS. 7A through 7G are a series of views taken along respective corresponding view lines in FIG. 5A showing the contour formed by the intersection of each of the first and second hulls with a plane erected perpendicular to the vertical axis in FIG. 5A at each viewing point therealong.
Figure 7B:
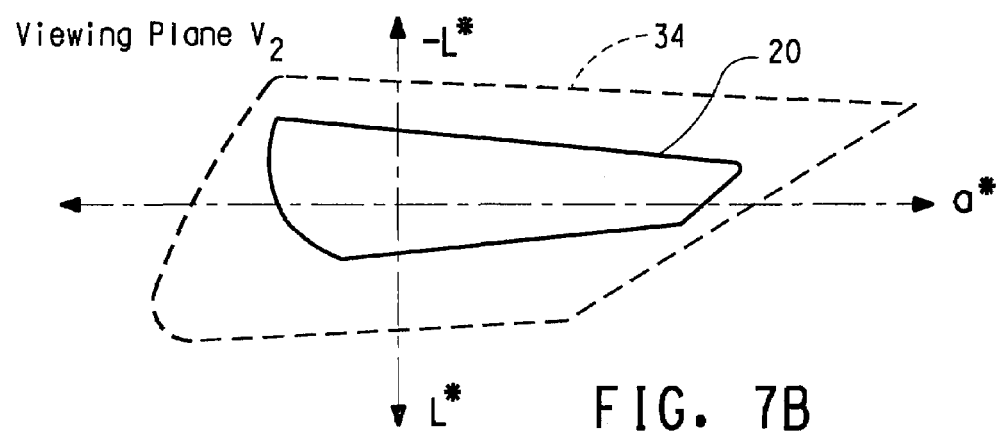
Figure 7C:
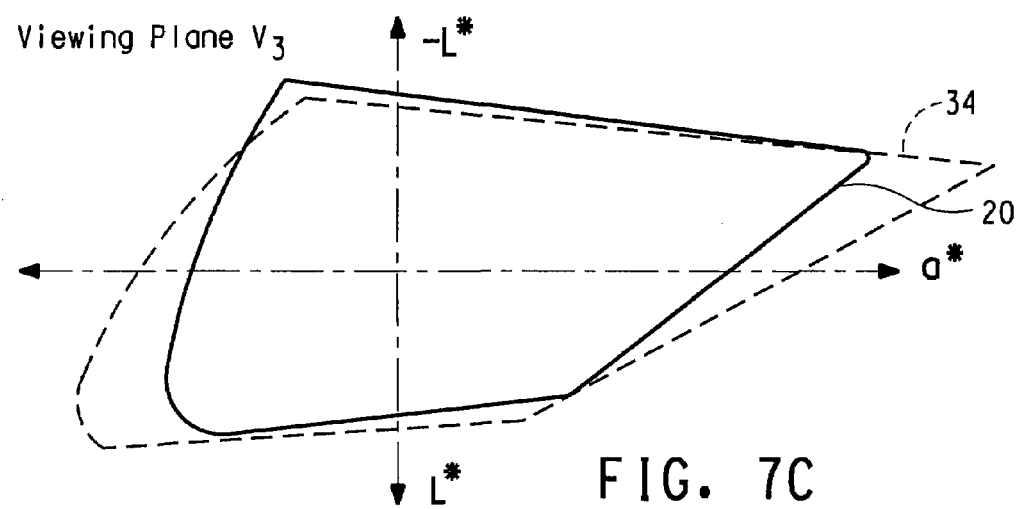
Figure 7D:
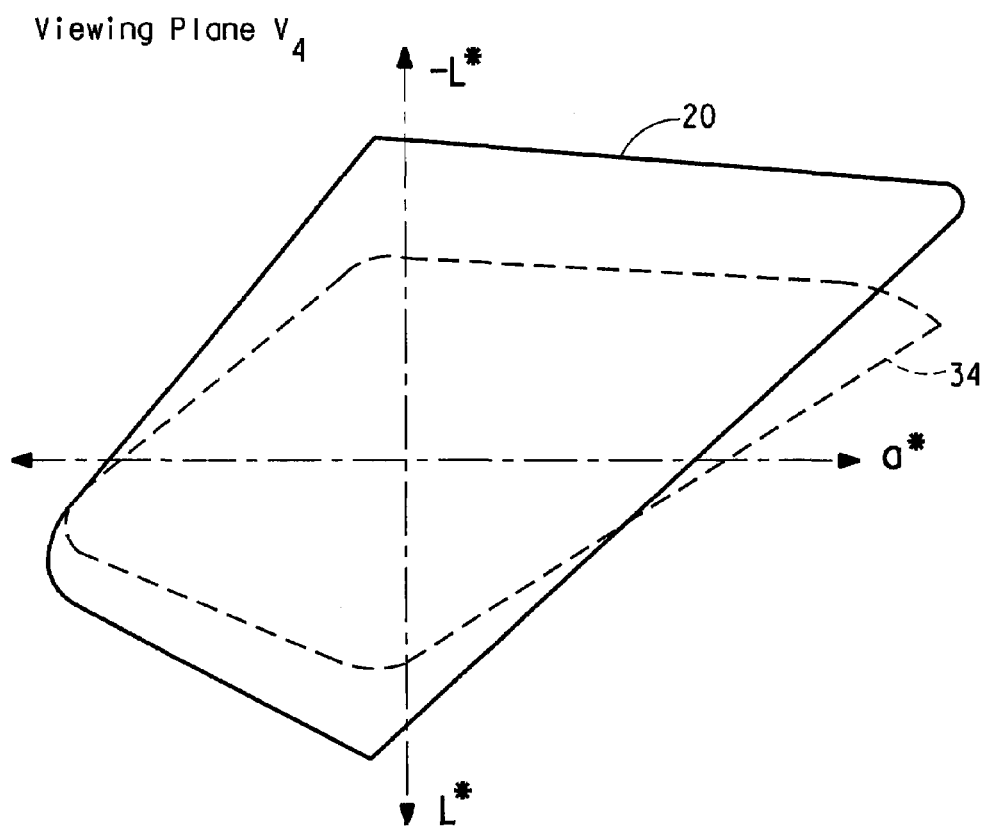
Figure 7E:
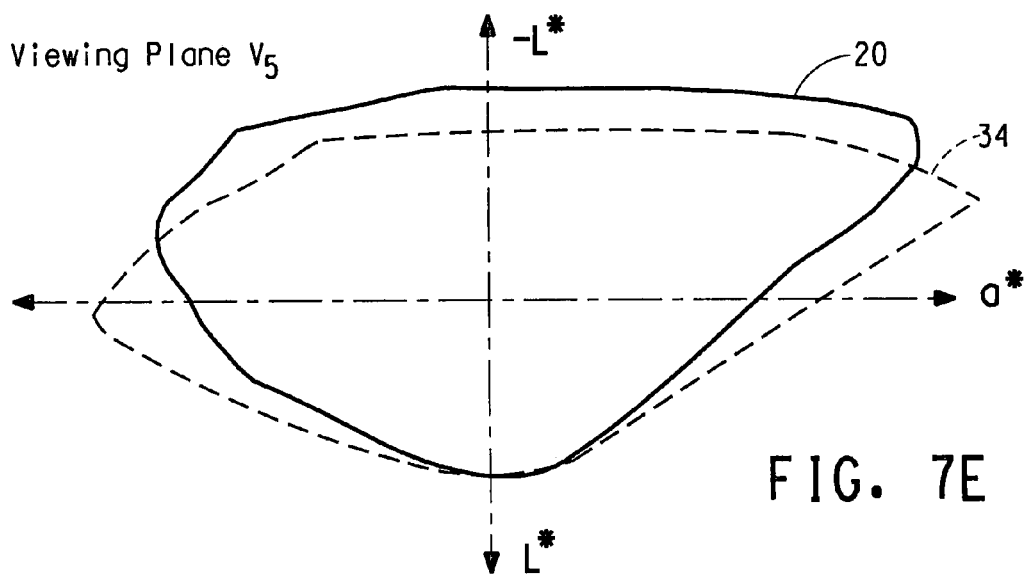
Figure 7F:
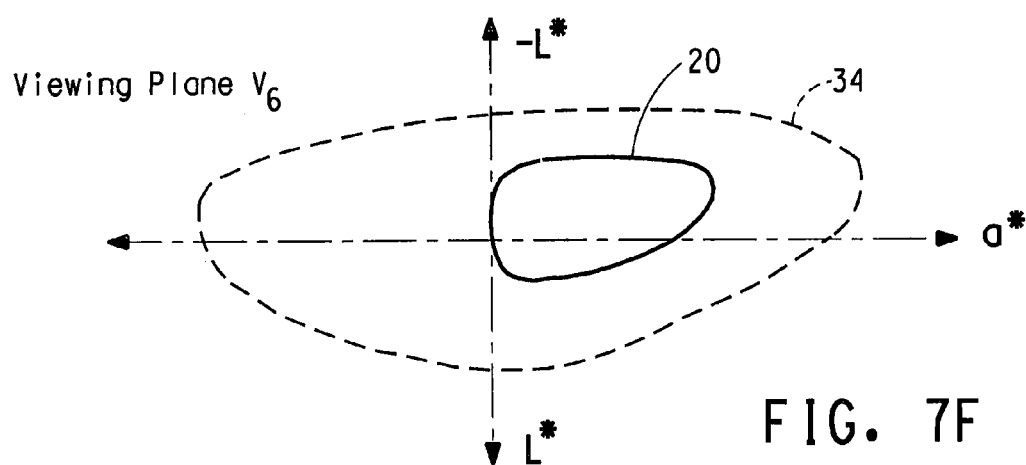
Figure 7G:
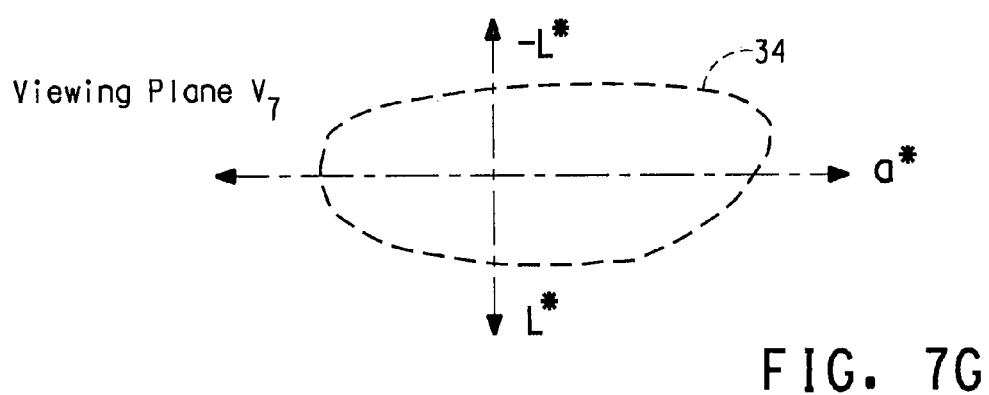

Region of Exclusion (Difference of Hulls) The Boolean difference of the first and second hulls 20, 34 is a hull 60 which defines the volume contained in a first hull but not in a second hull. The difference hull 60 is calculated in block 56 (FIG. 2) and may contain plural segments 60A, 60B (FIGS. 6A, 6B). Again, in the preferred instance of the implementation of the present invention the two hulls must be convex and the normals for both convex hulls must point outward.

The difference calculation using implicit modeling is done on a three-dimensional grid. An "implicit function", defined on the grid points, is derived for each gamut. The implicit function value at a point is simply the signed distance of the point from the gamut boundary. A negative implicit function value at a point indicates the point is inside the convex region corresponding to the gamut. A positive value indicates that the point is outside the gamut. The implicit function's value between grid points can be determined, for example, with trilinear interpolation. The boundary, or hull, for gamut difference becomes the locus of points which have an implicit function value of zero. In other words, if func(x, y, z) is the implicit function for a gamut, then the hull of the gamut is the set of points where func(x, y, z)=0. This is also called the "isosurface" of func(x, y, z) corresponding to a value of 0.

The distance of a point from a gamut is calculated by looping through the triangles for that gamut and calculating the distance to each of the triangles composing the gamut's hull. The minimum of these distances is the distance to the gamut. Various tactics can be used to speed this calculation by quickly eliminating many of the triangles from consideration that they may be the triangle producing the minimum. If the hull is convex it can be determined if a point is inside the hull by evaluating it in each of the palne equations for the planes bounding the hull. In order for the point to be inside the hull of on the surface of the hull, all the plane equations must evaluate to a number less than or equal to zero. If a point is indeed a gamut then its distance to the gamut is set negative.

Boolean set operations for implicit functions based on the distance field calculation just described are further explained by the following:

Let func, func1, and func2 be implicit functions

Let Comp(func) be the set complement of func

Let Int(func1, func2) be the set intersection of func1 and func2 let Diff(func1, func2) be the set difference of func1 and func2 then,

Comp(func)=−func

Int(func1, func2)=maximum(func1, func2)

Diff(func1, func2)=Int(func1, Comp(func2))=maximum(func1, −func2)  [Equation 1]

Now, let Gam1(x, y, z) and Gam2(x, y, z) be the implicit functions for two gamuts.

Let GamDiff(x, y, z) be the implicit function for the set difference of the two gamuts.

It follows from [Equation 1] that:

GamDiff(x, y, z)=maximum(Gam1(x, y, z), −Gam2(x, y, z))

The hull for GamDiff is the isosurface defined implicitly by GamDiff(x, y, z)=0.

In the preferred implementation the calculation is facilitated by object classes vtkContourFilter, vtkImplicitBoolean, vtkplanes, and vtkSampleFunction.

The calculation can be made as accurate as desired by increasing the density of the grid points, but at the expense of increased computational time. Another way to increase accuracy using the same grid points is to filter the distances to drop off perpendicular to the surfaces as a Gaussian as described in "Alias-free voxelization of geometric objects", Sramek and Kaufman, IEEE Transactions on Visualization and Computer Graphics 3(5), pages 251–266, 1999.

This isosurface will be comprised of a very large number of triangles, especially if the grid on which GamDiff is defined is high resolution. Many of these triangles are actually coplanar or nearly coplanar within a user specified error threshold. Hence, the number of triangles can be reduced, and the geometric construct simplified, by using a decimation algorithm such as that available in the vtkDecimatePro object class. Methods for triangle mesh decimation have been described. See, for example, "Decimation of Triangle Meshes", Schroeder et al, Proceedings of Siggraph 92; and "Progressive Meshes", Hughes Hoppe, Proceedings of Siggraph 96.

The structure chart showing procedures used for the "dif commmand" is as follows:

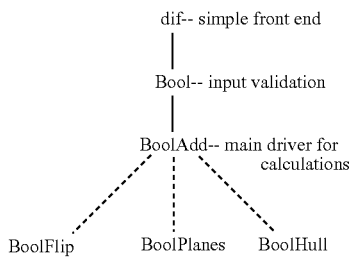

Both "BoolPlanes" and "BoolFlip" operate for the purposes discussed in connection with the "int command". "BoolContour" calculates the convex hull for the "dif" command.

The code for the "dif command" is as follows:

```
------------------"dif command"------------------
The "dif" command which calculates differences.
proc BoolAdd {op name name2 color} {
op can be either int or dif. The code shown here is only
for "dif". The code for "int".is listed above herein.
Make a name for the output gamut.
nameb = ${name}-${name2} for difference
Container for the output gamut's polygonal data
    set polydata ${nameb}GamPolyData
    vtkPolyData $polydata
Polygonal data and normals for the input gamuts
    set norm(1) ${name}GamPolyDataNormals
    set norm(2) ${name2}GamPolyDataNormals
Reverse direction of both input gamuts' normals if
necessary. They must point outwardly.
        BoolFlip 2 norm
        for {set i 1} {$i <= 2} {incr i} {
BoolPlanes calculates a point and a normal defining each
bounding plane for a hull. These are put into $points
and $normals which are temporary containers.
            set norml(1) $norm($i)
            BoolPlanes 1 norml $points $normals
Set planes(1) and planes(2) to be the planes defining
input gamut 1 and input gamut 2 respectively
            set planes ($i) BooPlanes$i
            vtkPlanes $planes($i)
            $planes($i) SetPoints $points
            $planes($i) SetNormals $normals
        }
Use "Implicit Modeling" to calculate the output gamut's
hull into $polydata.  (BoolContour code is included below.)
        BoolContour $planes(1) $planes(2) $polydata
Add new gamut
        addGamut $nameb $color 1 $polydata
Calculate the volumes of the gamuts being operated on by
dif.  Also calculate the volume of the difference gamut.
Then print out percentages which quantify the gamut
alignment.
        massprop SetInput $polydata
        set volb [massprop GetVolume]
        massprop SetInput [$norm(1) GetOutput]
        set vol [massprop GetVolume]
        set perc [format "%6.2f" [expr 100. * $volb / $vol]]
        return "# Volume of $nameb = $volb\n\
                            # ${perc}% of $name ($vol)\n"
}
proc BoolContour {planes planes2 polydata} {
Calculate the convex boundary with vtkContour
Do boolean set difference operation on the two
implicit functions which define the input gamuts
    set boo BooImplicitBoolean
    vtkImplicitBoolean $boo
        $boo AddFunction $planes
        $boo AddFunction $planes2
        $boo SetOperationTypeToDifference
Sample the implicit function for the output gamut onto
a grid
        set sample BooSampleFunction
        vtkSampleFunction $sample
            $sample SetImplicitFunction $boo
The isosurface corresponding to an implicit function
valueof zero is the output gamut's hull
        set iso BooContourFilter
        vtkContourFilter $iso
            $iso SetInput [$sample GetOutput]
            $iso SetValue 0 0.0
Reduce the number of triangles using a decimation
algorithm
        set deci BooDecimatePro
        vtkDecimatePro $deci
            $deci SetInput [$iso GetOutput]
What's left of the triangles and points becomes the
output hull
        $polydata SetPoints [[$deci GetOutput] GetPoints]
        $polydata SetPolys [[$deci GetOutput] GetPolys]
        return
}
------------------------------------------------
```

It should be appreciated that although the Boolean operator difference is the preferred method of computing the exclusion of the first and second hulls, another Boolean operator or combination of operators that produce the equivalent result may be used. For example, A-B could be replaced by the equivalent expression (A|B|A)|(A|B|A) where A|B is equivalent to –(A^B) [–X is everything excluded from X]. The operator "|" is frequently referred to as "NAND".

Contour The "con" command implements the action of block 72 (FIG. 2) and displays the gamut contours shown in FIGS. 7A through 7G. The code set forth below generates views in the L* vs. a* plane, that is, views along the b* axis, the same views as shown in FIGS. 7A through 7G.

This command is event driven. The contour displayed is based upon the position along a reference axis (the viewing plane) selected by an operator using the mouse to implement a sliding scale of axis positions ("slider").

The Structure Chart showing procedures used for the "con" commmand is as follows:

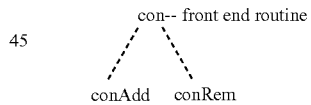

The routine "conRem" removes everything having to do with existing contours. The main driver for calculations is the routine "conAdd".

The code for the "con command" is as follows:

```
------------------"con command"------------------
proc conAdd(view) {
view can have three values "lva", "lvb", or "avb"
This code is only for the "lva" view (L* versus a*) .
These are the contours that are perpendicular to the b*
axis, as illustrated in FIGS. 7A through 7G.
global ConNames - A list of names of all loaded gamuts
global ConVar - This variable is the contour position.
It is dynamically changed when the user moves the
Tk Scale ("slider") with the mouse.
Set Tk Scale widget parameters for "lva" view
set sfrom "-120"
set sto "120"
```

```
                        -continued set slabel "b*"
set sres 1
set stic 20
Set other variables for "lva" view
set ConVar "0"        - scale position
set origin "50 0 0"   - origin and normal define cut plane
set normal "0 0 1"    - normal
Define plane to cut cross section for plot
vtkPlane is an implicit function
       vtkPlane ConPlane
             eval ConPlane SetOrigin $origin
             eval ConPlane SetNormal $normal
This loop cuts the gamuts with a plane to get the
contours.
ConNames is a list of the gamuts
       foreach name $ConNames {
            set normals ${name}GamPolyDataNormals
vtkCutter cuts through data using an implicit function
            set cutter ${name}ConCutter
            vtkCutter $cutter
                   $cutter SetInput [$normals GetOutput]
                   $cutter SetCutFunction ConPlane
The value of Convar determines the cut plane's position
            $cutter SetValue 0 $ConVar
            set mapper ${name}ConPolyDataMapper
            vtkPolyDataMapper $mapper
                   $mapper SetInput [$cutter GetOutput]
            set actor ${name}ConActor
            vtkActor $actor
                   $actor SetMapper $mapper
            renn AddActor ${name} ConActor
This code sets up the tcl/tk scale widget
When the scale is moved by the mouse the variable ConVar
is updated and the procedure conCmd is run. conCmd
causes the contours appearing on the screen to be
updated.
       set ConScale [frame .interact.contours]
       scale $ConScale.scale -from $sfrom -to $sto -length 300 \
              -variable ConVar -orient horizontal -label $slabel \
              -tickinterval $stic -showvalue true -command conCmd \
              -resolution $sres
       label $ConScale.label -text "Position of Contour"
       pack $ConScale.scale -side bottom -fill x
       pack $ConScale.label -side bottom -fill x
       pack  $ConScale -side bottom -after .interact.buttons - \
                         fill x
    return
}
```

Point In Gamut The "adp command" implements the action of block 76 (FIG. 2) to determine whether a test point $P_x$ representative of a given color lies within a gamut. The hull representing the gamut can be either a convex hull or an alpha hull.

The method used in implementing the present invention for testing the containment of a point within a hull is to cast a ray from the point in a random direction and count the number of intersections with triangles belonging to the hull. An odd number of hits indicates the test point is inside the hull.

Degenerate intersections (e.g., just grazing a surface or intersecting a corner) are detected but not analyzed; another ray is cast in a randomly chosen direction and process repeats. As the probability of a degenerate intersection is only about one percent (1%), it is seldom necessary to cast more than two rays for a test point.

In theory, there is no reliable test for containment when the hull is other than convex. However, the code developed as an embodiment of this invention has been quite reliable. It was adapted with relatively few changes from the code present in *Computational Geometry In C, 2nd Ed*, J. O'Rourke, Cambridge Univ. Press 1998, pages 245–252.

The code in this text is written in the C++ computer language. The adapted code interfaces with the reminder of the code used to implement the invention (written in tcl language) using the standard tcl facility, the "bidirectional pipe".

In order to achieve robustness, calculations are done by converting the real coordinates of the test point to large integers to avoid problems with computer floating point arithmetic. Similarly, the coordinates of the vertices of the hull are converted to large integers. In order to make the maximum number of significant digits in the integer coordinates be as large as possible, the integers are stored and processed using the mantissa part of the IEEE sixty-four bit floating point representation instead of using normal integer arithmetic.

A scaling feature is included to determine the scale factor used to convert from real numbers to integers adaptively based upon the maximum absolute value of the coordinates of the vertices of the hull being used to test the point and the coordinates of the test point. Scaling in this manner insures that the greatest arithmetic precision is achieved without exceeding the available register space afforded by the particular hardware configuration of the computing platform.

The Structure Chart showing procedures used by the "adp" command to determine if a test point is in a gamut appears as follows:

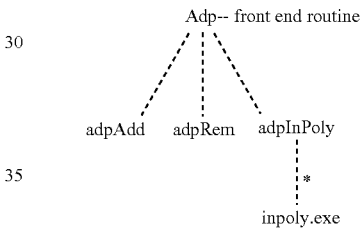

The purpose of the procedure "adpAdd" is the main driver for calculations. The procedure "adpRem" removes everything having to do with an existing point because a point can be re-entered to be tested relative to another gamut or to change its color.

The procedure "adpInPoly" is the procedure that determines if a test point is in a gamut. The actual test procedure as outlined above is done by an external C++ program which has been compiled and linked into "inpoly.exe." over the bidrectional pipe. The bidirectional pipe is indicated in boldface linewith the asterisk.

The code for the "adp command" is as follows:

```
------------------"adp command"------------------
proc adpInPoly {l a b name} {
The calculations will be done in integer coordinates.
The data points will be scaled before they are rounded
to the nearest integer. The next lines of code
determine the scale factor adaptively depending in the
size of the input data.
       set bounds [[$normals GetOutput] GetBounds]
       set xmax −10000.
       for { set n 0 } { $n < 6 } { incr n } {
              set xp [expr abs([lindex $bounds $n])]
              if { $xp > $xmax } { set xmax $xp }
       }
       set mult 400.
       if {$xmax > 125.} {set mult 40.}
       if {$xmax < 12.5} {set mult 4000.}
```

-continued

```
The bidirectional pipe is opened here
    set command inpoly.exe
    catch {open "|$command " r+} pipe
Write the input data for inpoly.exe to the pipe
multiplier
        puts $pipe "$mult"
number of points
        puts $pipe "$numpts"
points
        for { set i 0 } { $i < $numpts } { incr i } {
            set point [[$normals GetOutput] GetPoint $i]
            puts $pipe "$point"
        }
        set idl InPolyIdList
        vtkIdList $idl
number of triangles
        puts $pipe "$ncells"
triangles
    for { set i 0 } { $i < $ncells } { incr i } {
        eval [$normals GetOutput] GetCellPoints $i $idl
        puts $pipe "[$idl GetId 0] [$idl GetId 1] [$idl GetId 2]"
    }
test point
        puts $pipe "$l $a $b"
Get return value from inpoly.exe
    gets $pipe value
    catch {close $pipe}
    switch -exact -- $value {
        V { set msg "is a Vertex of"}
        E { set msg "is on an Edge of" }
        F { set msg "is on a Face of" }
        i { set msg "is interior to" }
        o { set msg "is exterior to" }
        default { set msg "Error-InPoly" }
    }
    return "# $l $a $b $msg $name"
}
```

Output Display Each hull, however created, is a surface in the three-dimensional CIE L*a*b* system space formed by triangles which share vertices wherein there are no holes. Each triangle is given as a list of three integers that are indices to the list of vertex coordinates.

This data structure is called a "triangle mesh". It can be displayed on an output device, such as a computer display or a printer, by using a three-dimensional graphics software library. One such library is the object oriented toolkit VTK, as herein mentioned. VTK interfaces to the output device using a three-dimensional graphics API (Application Programmer Interface) known as OpenGL. VTK is layered upon OpenGL which has lower level functionality which is closer to what the graphics hardware does.

In a preferred embodiment the software is used to control the appearance and orientation of the hull in a large number of ways. The color and opacity of the gamut's hull can be controlled. The vertices of the surface triangles can be shown. The orientation of the hull, that is, the perceived axis of observation, can be changed. The hull can be displayed as lines connecting the vertices. The hull can be sliced (i.e. cross-sectioned) in order to determine the contour of each hull in a specified plane. The distance of the slicing plane from the viewer's eye can be changed dynamically by manipulating the slider. Two or more hulls can be in the graphics viewport simultaneously, providing another way to visualize gamut overlap. Also, if desired, a user specified point can be displayed along with the hull(s).

The following two code segments demonstrate the way objects are displayed. When using the object-oriented graphics provided by VTK it is necessary is to describe the "scene" to be displayed. The object-oriented graphics package makes the picture (i.e., renders the scene) from the scene description.

The code to display something logically divides into two parts. The first task is to set up the displayvgraphics window(s), device interaction handlers, and rendering system. The second task is to provide the scene description in the form of a set of pipelines. Each object to be displayed (called an "actor") has a pipeline driving it which links together the other objects needed to supply its functionality.

The code to set up the graphics windows is shared by all the actors. It is contained in the file "gamuts.tcl". In simplified form it is:

```
------------------"gamuts.tcl"------------------
Create a renderer
        vtkRenderer renn
Create a window for three-dimensional graphics
        vtkRenderWindow renWin
        renWin AddRenderer renn
        renWin SetWindowName "gamut visualizer"
Create an interactor to handle mouse movements
        vtkRenderWindowInteractor iren
        iren SetRenderWindow renWin
Set background color
        renn SetBackground .5 .5 .5
Position the camera
        set camera [renn GetActiveCamera]
        $camera SetFocalPoint 0 0 0
        $camera SetPosition 0 0 -1
        $camera ComputeViewPlaneNormal
        $camera SetViewUp 1 0 0
        renn ResetCamera
        $camera Zoom 1.4
Prepare the interactor to handle events
        iren Initialize
For an example of setting up the pipeline for an actor,
here is the code to display a gamut, taken from the
addGamut procedure.
Create normals. They are required for determining the
effect of lighting on the gamut hull. Two-sided lighting is
used by default.
        set normals ${name}GamPolyDataNormals
        vtkPolyDataNormals $normals
            $normals SetInput $polydata
A mapper is required. It generates output in a form
that can be plotted. This output is triangles for a
hull.
        set mapper ${name}GamPolyDataMapper
        vtkPolyDataMapper $mapper
            $mapper SetInput [$normals GetOutput]
An actor is required. Actors are the things that appear
in the scene.
        set actor ${name}GamActor
        vtkActor $actor
            $actor SetMapper $mapper
Every actor has properties which determine it's color
These are some of them. The opacity is also set.
            eval [$actor GetProperty] SetDiffuseColor $r $g $b
            eval [$actor GetProperty] SetSpecularPower 50
            eval [$actor GetProperty] SetSpecular .5
            eval [$actor GetProperty] SetDiffuse .8
            eval [$actor GetProperty] SetOpacity $opacity
Each renderer has a list of actors to display
        renn AddActor ${name}GamActor
Each triangle will be colored with one color
        [${name}GamActor GetProperty] SetInterpolationToFlat
Lights! Camera! Action! Start the rendering!
        renWin Render
                    -o-0-o-
```

Those skilled in the art, having the benefit of the teachings of the present invention as hereinabove set forth, may effect modifications or extensions thereto.

For example, the teachings of the present invention may be directly extendable to situations in which the color of an object is described by color coordinates L*a*b* in the CIE L*a*b* system depicted at some number of multiple viewing angles, (e.g., three viewing angles). Such a system is used, for example, in automotive paint refinish applications. The color of a point depends on the viewing direction. Measuring the color from three directions is considered sufficient. To support this use, a single graphics display window may be replaced by three graphics display windows, each of which contains a gamut for the color measured in one to the three directions.

What is claimed is:

1. A computer-readable medium containing a program for configuring a digital computer to perform a method for comparing a first color gamut able to be produced by a color generating apparatus upon a given medium with a second color gamut, the method comprising the steps of:
   a) using a first collection of sample color points to create a first hull in the color space, each sample color point in the first collection defining a location in at least a three-dimensional color space and corresponding to a color in the first color gamut,
   the set of all of the points disposed on the surface of the first hull or within the volume enclosed thereby representing the first color gamut,
   all of the color points in the first collection of sample color points being disposed on the surface of the hull or within the volume defined thereby;
   b) using a second collection of sample color points to create a second hull in the color space, each sample color point in the second collection defining a location in at least a three-dimensional color space and corresponding to a color in the second color gamut,
   the set of all of the points disposed on the surface of the second hull or within the volume enclosed thereby representing the second color gamut,
   all of the color points in the second collection of sample color points being disposed on the surface of the second hull or within the volume defined thereby; and
   c) combining the first and second hulls thereby to create a third hull in the color space representing the region of overlap or the region of exclusion between the first color gamut and the second color gamut,
   wherein the combining step is implemented using a calculation, and further wherein
   when the third hull represents the region of overlap, each point disposed on the surface of the third hull or within the volume enclosed thereby represents a color within both the first and the second color gamuts, and
   when the third hull represents the region of exclusion, each point disposed on the surface of the third hull or within the volume enclosed thereby represents a color within the first gamut but not within the second gamut.

2. The computer-readable medium of claim 1 wherein the method further comprises the steps of:
   d) determining the volume enclosed within one of the first or second hulls;
   e) determining the volume enclosed within the third hull representing the region of overlap or the region of exclusion; and
   f) comparing the volumes of the first or second hulls with the volume of the third hull.

3. The computer-readable medium of claim 1 wherein the combining step is implemented using the Boolean intersection operation to create the third hull representing the region of overlap between the first color gamut and the second color gamut and the Boolean difference operation to create the third hull representing the region of exclusion between the first color gamut and the second color gamut.

4. A computer-implemented method for comparing a first color gamut able to be produced by a color generating apparatus upon a given medium with a second color gamut, the method comprising the steps of:
   a) using a first collection of sample color points to create a first hull in the color space, each sample color point in the first collection defining a location in at least a three-dimensional color space and corresponding to a color in the first color gamut,
   the set of all of the points disposed on the surface of the first hull or within the volume enclosed thereby representing the first color gamut,
   all of the color points in the first collection of sample color points being disposed on the surface of the hull or within the volume defined thereby;
   b) using a second collection of sample color points to create a second hull in the color space, each sample color point in the second collection defining a location in at least a three-dimensional color space and corresponding to a color in the second color gamut,
   the set of all of the points disposed on the surface of the second hull or within the volume enclosed thereby representing the second color gamut,
   all of the color points in the second collection of sample color points being disposed on the surface of the second hull or within the volume defined thereby; and
   c) combining the first and second hulls thereby to create a third hull in the color space representing the region of overlap or the region of exclusion between the first color gamut and the second color gamut,
   wherein the combining step is implemented using a calculation, and further wherein
   when the third hull represents the region of overlap, each point disposed on the surface of the third hull or within the volume enclosed thereby represents a color within both the first and the second color gamuts, and
   when the third hull represents the region of exclusion, each point disposed on the surface of the third hull or within the volume enclosed thereby represents a color within the first gamut but not within the second gamut.

5. The computer-implemented method of claim 4 wherein the combining step is implemented using at least one Boolean operation.

6. The computer-implemented method of claim 5 wherein the combining step is implemented using the Boolean intersection operation to create a third hull representing the region of overlap between the first color gamut and the second color gamut.

7. The computer-implemented method of claim 5 wherein the combining step is implemented using the Boolean difference operation to create a third hull representing the region of exclusion between the first color gamut and the second color gamut.

8. The computer-implemented method of claim 4 further comprising the steps of:
   d) determining the volume enclosed within one of the first or second hulls;
   e) determining the volume enclosed within the third hull representing the region of overlap or the region of exclusion; and
   f) comparing the volumes of the first or second hulls with the volume of the third hull.

9. The computer-implemented method of claim 4 wherein at least one of the first or second hulls is a convex hull.

10. The computer-implemented method of claim 4 wherein at least one of the first or second hulls is an alpha hull.

11. A computer-implemented method for comparing a first color gamut able to be produced by a color generating apparatus upon a given medium with a second color gamut, the method comprising the steps of:
   a) using a first collection of sample color points to create a plurality of boundary surfaces collectively defining a first hull in the color space, each sample color point in the first collection defining a location in at least a three-dimensional color space and corresponding to a color in the first color gamut,
   the set of all of the points disposed on the surface of the first hull or within the volume enclosed thereby representing the color gamut able to be produced by the color generating apparatus,
   all of the color points in the first collection of sample color points being disposed on the surface of the first hull or within the volume defined thereby;
   b) using a second collection of sample color points to create a plurality of boundary surfaces collectively defining a second hull in the color space, each sample color point in the second collection defining a location in at least a three-dimensional color space and corresponding to a color in the second color gamut,
   the set of all of the points disposed on the surface of the second hull or within the volume enclosed thereby representing the second color gamut,
   all of the color points in the second collection of sample color points being disposed on the surface of the second hull or within the volume defined thereby;
   c) combining the first and second hulls thereby to create a plurality of boundary surfaces collectively defining a third hull in the color space representing a region of overlap of the first and second gamuts,
   such that each point disposed on the surface of the third hull or within the volume enclosed thereby representing a color that is within both the first and the second color gamuts,
   wherein the combining step is implemented using a calculation.

12. The computer-implemented method of claim 11 comprising the step of:
   d) displaying on a two-dimensional display apparatus a visual representation of the third hull.

13. The computer-implemented method of claim 12 wherein any or all of the color, opacity, or orientation of the two-dimensional display of the third hull is selectably controllable.

14. The computer-implemented method of claim 11 wherein:
   the first collection of sample color points is derived from a screen color printing apparatus; and
   the second collection of sample color points is derived from an ink jet color printing apparatus; and
   the each point disposed on the surface of the third hull or within the volume enclosed thereby represents a color that lies within the gamut of both the ink jet color printing apparatus and the screen color printing apparatus.

15. The computer-implemented method of claim 11 wherein:
   the first collection of sample color points is derived from an ink jet color printing apparatus having a first palette of N number of colored inks; and
   the second collection of sample color points is derived from the same ink jet color printing apparatus using a second palette of M number of colored inks, where N and M are the same or different numbers; and
   the each point disposed on the surface of the third hull or within the volume enclosed thereby represents a color that lies within both the gamut of ink jet color printing apparatus having the palette of N number of colored inks and within the gamut of the ink jet color printing apparatus having the palette of M number of colored inks.

16. The computer-implemented method of claim 15 wherein the number of colored inks in the second palette are included within the N number of colored inks of the first palette.

17. The computer-implemented method of claim 15 wherein at least one of the M number of colored inks in the second palette is not included within the N number of colored inks of the first palette.

18. The computer-implemented method of claim 15 wherein none of the N number of colored inks in the second palette is included within the N number of colored inks of the first palette.

19. The computer-implemented method of claim 11 wherein:
   the first collection of sample color points is derived from a first ink jet color printing apparatus having a first palette of N number of colored inks; and
   the second collection of sample color points is derived from a second ink jet color printing apparatus using a second palette comprising a M number of colored inks; and
   the each point disposed on the surface of the third hull or within the volume enclosed thereby represents a color that lies within both the gamut of ink jet color printing apparatus having the palette of N number of colored inks and within the gamut of the ink jet color printing apparatus having the palette of M number of colored inks.

20. The computer-implemented method of claim 19 wherein the M number of colored inks in the second palette are included within the N number of colored inks of the first palette.

21. The computer-implemented method of claim 19 wherein at least one of the N number of colored inks in the second palette is not included within the N number of colored inks of the first palette.

22. The computer-implemented method of claim 19 wherein none of the M number of colored inks in the second palette is included within the N number of colored inks of the first palette.

23. The computer-implemented method of claim 11 wherein both the first and the second hulls are convex hulls.

24. The computer-implemented method of claim 11 wherein at least one of the first or second hulls is an alpha hull.

25. The computer-implemented method of claim 11 wherein the color space is the three-dimensional CIE L*a*b* system color space.

26. The computer-implemented method of claim 25 wherein at least the first collection of sample color points is generated using the steps of:
   using the color generating apparatus, printing upon a given medium a plurality of sample colors;
   measuring the reflectance of each of the sample colors; and converting the measured reflectances into coordinates in the three-dimensional CIE L*a*b* system color space.

27. The computer-implemented method of claim 11 further comprising the steps of:
d) determining the volume enclosed by the first hull; and
e) determining the volume enclosed by the third hull; and
f) comparing the volumes of the first and third hulls thereby to provide an indication of the extent to which the second color gamut overlaps the first color gamut.

28. The computer-implemented method of claim 11 further comprising the steps of:
d) determining the volume enclosed by the second hull; and
e) determining the volume enclosed by the third hull; and
f) comparing the volumes of the second and third hulls thereby to provide an indication of the extent to which the first color gamut overlaps the second color gamut.

29. The computer-implemented method of claim 11 wherein the combining step is implemented using at least one Boolean operation.

30. The computer-implemented method of claim 29 wherein the Boolean operation is intersection.

31. A computer-implemented method for comparing a first color gamut able to be produced by a color generating apparatus upon a given medium with a second color gamut, the method comprising the steps of:
a) using a first collection of sample color points to create a plurality of boundary surfaces collectively defining a first hull in the color space, each sample color point in the first collection defining a location in at least a three-dimensional color space and corresponding to a color in the first color gamut,
the set of all of the points disposed on the surface of the first hull or within the volume enclosed thereby representing the color gamut able to be produced by the color generating apparatus,
all of the color points in the first collection of sample color points being disposed on the surface of the first hull or within the volume defined thereby;
b) using a second collection of sample color points to create a plurality of boundary surfaces collectively defining a second hull in the color space, each sample color point in the second collection defining a location in at least a three-dimensional color space and corresponding to a color in the second color gamut,
the set of all of the points disposed on the surface of the second hull or within the volume enclosed thereby representing the second color gamut,
all of the color points in the second collection of sample color points being disposed on the surface of the second hull or within the volume defined thereby;
c) combining the first and second hulls thereby to create a plurality of boundary surfaces collectively defining a third hull in the color space representing the region of exclusion of the first and second gamuts,
such that each point disposed on the surface of or within the volume enclosed by the third hull representing a color that is within the first gamut but not within the second color gamut,
wherein the combining step is implemented using a calculation.

32. The computer-implemented method of claim 31 comprising the step of:
d) displaying on a two-dimensional display apparatus a visual representation of the third hull.

33. The computer-implemented method of claim 32 wherein any or all of the color, opacity, or orientation of the two-dimensional display of the third hull is selectably controllable.

34. The computer-implemented method of claim 31 wherein:
the first collection of sample color points is derived from a screen color printing apparatus; and
the second collection of sample color points is derived from an ink jet color printing apparatus; and
each point disposed on the surface of or within the volume enclosed by the third hull represents a color that is within the first gamut but not within the second color gamut.

35. The computer-implemented method of claim 31 wherein:
the first collection of sample color points is derived from an ink jet color printing apparatus having a first palette of N number of colored inks; and
the second collection of sample color points is derived from the same ink jet color printing apparatus using a second palette of M number of colored inks, where N and M are the same or different numbers; and
each point disposed on the surface of or within the volume enclosed by the third hull represents a color that is within the gamut of ink jet color printing apparatus having the palette of N number of colored inks but not within the gamut of the ink jet color printing apparatus having the palette of M number of colored inks.

36. The computer-implemented method of claim 35 wherein the number of colored inks in the second palette are included within the N number of colored inks of the first palette.

37. The computer-implemented method of claim 35 wherein at least one of the M number of colored inks in the second palette is not included within the N number of colored inks of the first palette.

38. The computer-implemented method of claim 35 wherein none of the N number of colored inks in the second palette is included within the N number of colored inks of the first palette.

39. The computer-implemented method of claim 31 wherein:
the first collection of sample color points is derived from a first ink jet color printing apparatus having a first palette of N number of colored inks; and
the second collection of sample color points is derived from a second ink jet color printing apparatus using a second palette comprising a M number of colored inks; and
each point disposed on the surface of or within the volume enclosed by the third hull represents a color that is within the gamut of ink jet color printing apparatus having the palette of N number of colored inks but not within the gamut of the ink jet color printing apparatus having the palette of M number of colored inks.

40. The computer-implemented method of claim 39 wherein the M number of colored inks in the second palette are included within the N number of colored inks of the first palette.

41. The computer-implemented method of claim 39 wherein at least one of the N number of colored inks in the second palette is not included within the N number of colored inks of the first palette.

42. The computer-implemented method of claim 39 wherein none of the M number of colored inks in the second palette is included within the N number of colored inks of the first palette.

43. The computer-implemented method of claim 31 wherein both the first and the second hulls are convex hulls.

44. The computer-implemented method of claim 31 wherein the color space is the three-dimensional CIE L*a*b* system color space.

45. The computer-implemented method of claim 44 wherein at least the first collection of sample color points is generated using the steps of:
   using the color generating apparatus, printing upon a given medium a plurality of sample colors;
   measuring the reflectance of each of the sample colors; and
   converting the measured reflectances into coordinates in the three-dimensional CIE L*a*b* system color space.

46. The computer-implemented method of claim 31 further comprising the steps of:
   d) determining the volume enclosed by the first hull;
   e) determining the volume enclosed by the third hull; and
   f) comparing the volumes of the first and third hulls.

47. The computer-implemented method of claim 46 further comprising the steps of:
   g) determining the volume enclosed by the second hull; and
   h) comparing the volumes of the second and third hulls.

48. The computer-implemented method of claim 31 wherein the combining step is implemented using at least one Boolean operation.

49. The computer-implemented method of claim 48 wherein the Boolean operation is the difference operation.

50. A computer-implemented method for comparing a first color gamut able to be produced by a color generating apparatus upon a given medium with a second color gamut, the method comprising the steps of:
   a) using a first collection of sample color points to create a plurality of boundary surfaces collectively defining a first hull in the color space, each sample color point in the first collection defining a location in at least a three-dimensional color space and corresponding to a color in the first color gamut,
   the set of all of the points disposed on the surface of the first hull or within the volume enclosed thereby representing the color gamut able to be produced by the color generating apparatus,
   all of the color points in the first collection of sample color points being disposed on the surface of the hull or within the volume defined thereby;
   b) using a second collection of sample color points to create a plurality of boundary surfaces collectively defining a second hull in the color space, each sample color point in the second collection defining a location in at least a three-dimensional color space and corresponding to a color in the second color gamut,
   the set of all of the points disposed on the surface of the second confining hull or within the volume enclosed thereby representing the second color gamut,
   all of the color points in the second collection of sample color points being disposed on the surface of the second hull or within the volume defined thereby;
   c) for each of a plurality of locations along a predetermined reference line in the color space, generating a visual display of the contour in a plane perpendicular to that reference line that is produced by the intersection of one or both the first and the second hulls with that plane, thereby to ascertain qualitatively the degree of alignment of the first and second hulls along the reference line.

51. A computer-implemented method for determining whether a predetermined candidate color corresponding to a predetermined color point in at least a three-dimensional color space lies within a color gamut able to be produced by a color generating apparatus upon a given medium, the method comprising the steps of:
   a) using a first collection of sample color points to create a plurality of boundary surfaces collectively defining a first hull in the color space, each sample color point in the first collection defining a location in at least a three-dimensional color space and corresponding to a color in the first color gamut,
   the set of all the points disposed on the surface of the full or within the volume enclosed thereby representing the color gamut able to be produced by the color generating apparatus; and
   b) determining whether the point in the color space corresponding to the predetermined candidate color lies on the surface of the hull or within the volume defined thereby by casting a ray from the candidate color point and counting the number of intersections of the ray with said first hull such that an odd number of intersections of said ray with said first hull indicates the candidate color point is inside the first hull, wherein prior to the determination, scaling the collection of sample color points and the predetermined color point using a scale factor determined in accordance with the values in the color space of the sample color points and the value in the color space of the predetermined color point.

* * * * *